United States Patent
Maharry et al.

(10) Patent No.: US 12,413,328 B2
(45) Date of Patent: Sep. 9, 2025

(54) POLARIZATION-MULTIPLEXED SELF-HOMODYNE ANALOG COHERENT (PM-SH-ACD) ARCHITECTURE FOR OPTICAL COMMUNICATION LINKS

(71) Applicant: Lucidean, Inc., Wimington, DE (US)

(72) Inventors: Aaron Maharry, Goleta, CA (US);
Hector Adolfo Andrade Paez, Goleta, CA (US); Clint Lee Schow, Santa Barbara, CA (US); Larry Allen Coldren, Santa Barbara, CA (US); James Franklin Buckwalter, Santa Barbara, CA (US)

(73) Assignee: Lucidean, Inc., Goleta, CA (US)

( * ) Notice: Subject to any disclaimer, the term of this patent is extended or adjusted under 35 U.S.C. 154(b) by 199 days.

(21) Appl. No.: 18/492,575

(22) Filed: Oct. 23, 2023

(65) Prior Publication Data

US 2024/0056214 A1 Feb. 15, 2024

Related U.S. Application Data

(63) Continuation of application No. 18/307,717, filed on Apr. 26, 2023, now Pat. No. 11,811,499.
(Continued)

(51) Int. Cl.
  *H04J 14/06* (2006.01)
  *H04B 10/077* (2013.01)
  *H04B 10/63* (2013.01)
(52) U.S. Cl.
  CPC ............ *H04J 14/06* (2013.01); *H04B 10/077* (2013.01); *H04B 10/63* (2013.01)

(58) Field of Classification Search
  CPC ........ H04B 10/077; H04B 10/63; H04J 14/06
  (Continued)

(56) References Cited

U.S. PATENT DOCUMENTS 9,209,900 B2 * 12/2015 Cai .................. H04J 14/06
10,763,968 B1    9/2020 Li et al.
(Continued)

FOREIGN PATENT DOCUMENTS

CN      113746563 A  * 12/2021  ............ H04B 10/63

OTHER PUBLICATIONS

Puttnam et al; Self-Homodyne Detection in Optical Communication Systems; 2014; Photonics; pp. 1-21. (Year: 2014).*
(Continued)

*Primary Examiner* — Amritbir K Sandhu

(57) ABSTRACT

A polarization-multiplexed self-homodyne analog coherent (PM-SH-ACD) architecture for optical communication links has a receiver section that polarization un-rotates a signal from a fiber optic cable into first and second polarized optical signals; recovers a polarization of the first and second optical signals based on a received polarization recovery signal that is based on a pilot signal measurement signal; demodulates the first optical signal into optical QPSK data and pilot tone signals; demodulates the second optical signal into an optical modulating laser light; splits the first and second optical signals into optical QPSK quadrature signals; converts the optical QPSK quadrature signals into electrical QPSK quadrature signals; detects a polarization of the pilot tone signal and outputs the pilot signal measurement signal polarization recovery signal based on the detected polarization.

16 Claims, 15 Drawing Sheets

Related U.S. Application Data

(60) Provisional application No. 63/334,877, filed on Apr. 26, 2022.

(58) Field of Classification Search
USPC .......................................................... 398/65
See application file for complete search history.

(56) References Cited

U.S. PATENT DOCUMENTS

| | | | |
|---|---|---|---|
| 10,985,843 B2 | 4/2021 | Razzell | |
| 11,626,926 B2 | 4/2023 | Zhou et al. | |
| 11,811,499 B1* | 11/2023 | Maharry | H04B 10/614 |
| 12,119,881 B2* | 10/2024 | Doerr | H04B 10/6166 |
| 2019/0229811 A1* | 7/2019 | Gupta | H04B 10/614 |
| 2023/0097053 A1* | 3/2023 | Doerr | H04B 10/556 398/17 |
| 2023/0396339 A1* | 12/2023 | Doerr | H04J 14/0213 |

OTHER PUBLICATIONS

Luis et al; Self-Homodyne Detection of Polarization-Multiplexed Pilot Tone Signals Using a Polarization Diversity Coherent Receiver ; Sep. 2013; IEEE; pp. 1-3. (Year: 2013).*

Perin et al., DSP-Free Coherent Receivers for Data Center Links, Journal, E. L. Ginzton Laboratory, Department of Electrical Engineering, Stanford University, Stanford, CA, 94305 USA, https://web.stanford.edu/~jkperin/OFC_DSP_free_coherent.pdf, last accessed Apr. 27, 2023, 3 total pages.

Z. Lin, "High-performance and Ultra-compact Endless Automatic Polarization Controller based on Thin-film Lithium Niobate," in OFC, San Diego, California, 2022.

M. Taylor, "Phase Estimation Methods for Optical Coherent Detection Using Digital Signal Processing," Journal of Lightwave Technology, vol. 27, No. 7, pp. 901-914, 2009.

Puttnam et al., Open Access Photonics, ISSN 2304-6732, Photonics 2014, 1, 110-130; doi:10.3390/photonics1020110, https://www.mdpi.com/2304-6732/1/2/110 last accessed Apr. 26, 2023, 21 total pages.

Costas et al., Synchronous Communications, Proceedings of the IRE, pp. 1713-1718, last accessed on Apr. 10, 2023 at 21:31:58 UTC from IEEE Xplore.

Madsen et al., Reset-Free Integrated Polarization Controller Using Phase Shifters, IEEE Journal of Selected Topics in Quantum Electronics, vol. 11, No. 2, Mar./Apr. 2005, pp. 431-438, last accessed on Apr. 10, 2023 at 21:12:55 UTC from IEEE Xplore.

Park et al., 40Gbit/s coherent optical receiver using a Costas loop, 7 total pages, https://coldren.ece.ucsb.edu/sites/default/files/publications/18_park_oe_costas_loop_dec12.pdf, last accessed Apr. 26, 2023.

* cited by examiner

How to obtain error signal e(t)

- $T_{Total} = T_{Controller} T_{Fiber} = \begin{bmatrix} A-jB & -C-jD \\ C-jD & A+jB \end{bmatrix} \begin{bmatrix} E-jF & -G-jH \\ G-jH & E+jF \end{bmatrix} = \begin{bmatrix} W-jX & -Y-jZ \\ Y-jZ & W+jX \end{bmatrix}$

- $E_{Hybrid,input} = \begin{bmatrix} W-jX & -Y-jZ \\ Y-jZ & W+jX \end{bmatrix} \begin{bmatrix} E_S \\ E_{LO} \end{bmatrix}$ ; $E_S = E_{SI} + E_{SQ}$, each containing a different tone

- $E_{I-tone\ in\ I-channel} = E_{SI}(W-jX) + E_{LO}(-Y-jZ) + E_{SI}(Y-jZ) + E_{LO}(W+jX)$

- $Ipd_{I-tone\ in\ I-channel} \propto |E_{I-tone\ in\ I-channel}|^2 = 2E_{LO}E_{SI}(W^2 + X^2 + Y^2 + Z^2)$
- $Ipd_{I-tone\ in\ Q-channel} \propto 4E_{LO}E_{SI}(-WX - YZ)$
- $Ipd_{Q-tone\ in\ I-channel} \propto 4E_{LO}E_{SQ}(WX - YZ)$
- $Ipd_{Q-tone\ in\ Q-channel} \propto 2E_{LO}E_{SQ}(W^2 - X^2 + Y^2 - Z^2)$

- Solve 4 equations to get: $T_{Total} = \begin{bmatrix} W-jX & -Y-jZ \\ Y-jZ & W+jX \end{bmatrix}$

- $T_{Controller} = \begin{bmatrix} A-jB & -C-jD \\ C-jD & A+jB \end{bmatrix} \begin{bmatrix} E-jF & -G-jH \\ G-jH & E+jF \end{bmatrix}$, is already known (phase shifter voltages)

- Solve 4 equations to get: $T_{Fiber} = \begin{bmatrix} E-jF & -G-jH \\ G-jH & E+jF \end{bmatrix}$, subtract complementary angles to obtain e(t) for each degree of freedom

FIG. 8A

PR+CR Jones matrices

- Phase shifter $$\begin{bmatrix} e^{j\varphi} & 0 \\ 0 & e^{-j\varphi} \end{bmatrix}$$ ← 842

- 2x2 coupler $$\begin{bmatrix} \frac{1}{\sqrt{2}} & \frac{-j}{\sqrt{2}} \\ \frac{-j}{\sqrt{2}} & \frac{1}{\sqrt{2}} \end{bmatrix}$$ ← 844

FIG. 8B

POLARIZATION-MULTIPLEXED SELF-HOMODYNE ANALOG COHERENT (PM-SH-ACD) ARCHITECTURE FOR OPTICAL COMMUNICATION LINKS

RELATED APPLICATION INFORMATION

This patent is a continuation application from co-pending U.S. patent application Ser. No. 18/307,717, filed Apr. 26, 2023, which claims priority from U.S. Provisional Patent Application No. 63/334,877, titled, POLARIZATION-MULTIPLEXED SELF-HOMODYNE ANALOG COHERENT (PM-SH-ACD) ARCHITECTURE FOR OPTICAL COMMUNICATION LINKS, filed Apr. 26, 2022, all of which are incorporated herein by reference.

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to a polarization-multiplexed self-homodyne analog coherent (PM-SH-ACD) architecture for optical communication links.

Description of the Related Art

Optical communication is an important part of modern communication techniques due to the excessive bandwidth of the light spectrum. Theoretically, optical communication has much higher system throughput than its radio frequency (RF) communication counterpart. Therefore, it finds many applications and facilitates our lives. Some typical optical communication scenarios include optical fiber communication, free-space optical communication, and visible light communication.

Some architectures for optical communication links employ coherent modulation/demodulation, whereby both phase and amplitude of light are modulated to transmit data across an optical fiber channel. In coherent communication it is necessary to perform carrier recovery (CR) to demodulate the signal at the receiver. CR consists of phase-locking an unmodulated carrier to the received modulated signal.

DESCRIPTION OF THE DRAWINGS

FIG. 8A is an example of equations for how to obtain error signal e(t) for polarization closed-loop control block diagram and of components of a receiver.

FIG. 8B is an example of Jones matrices for proportional, integral, derivative (PID) tuning of the phase shifters and couplers of the PR and CR block.

Figure 1A:
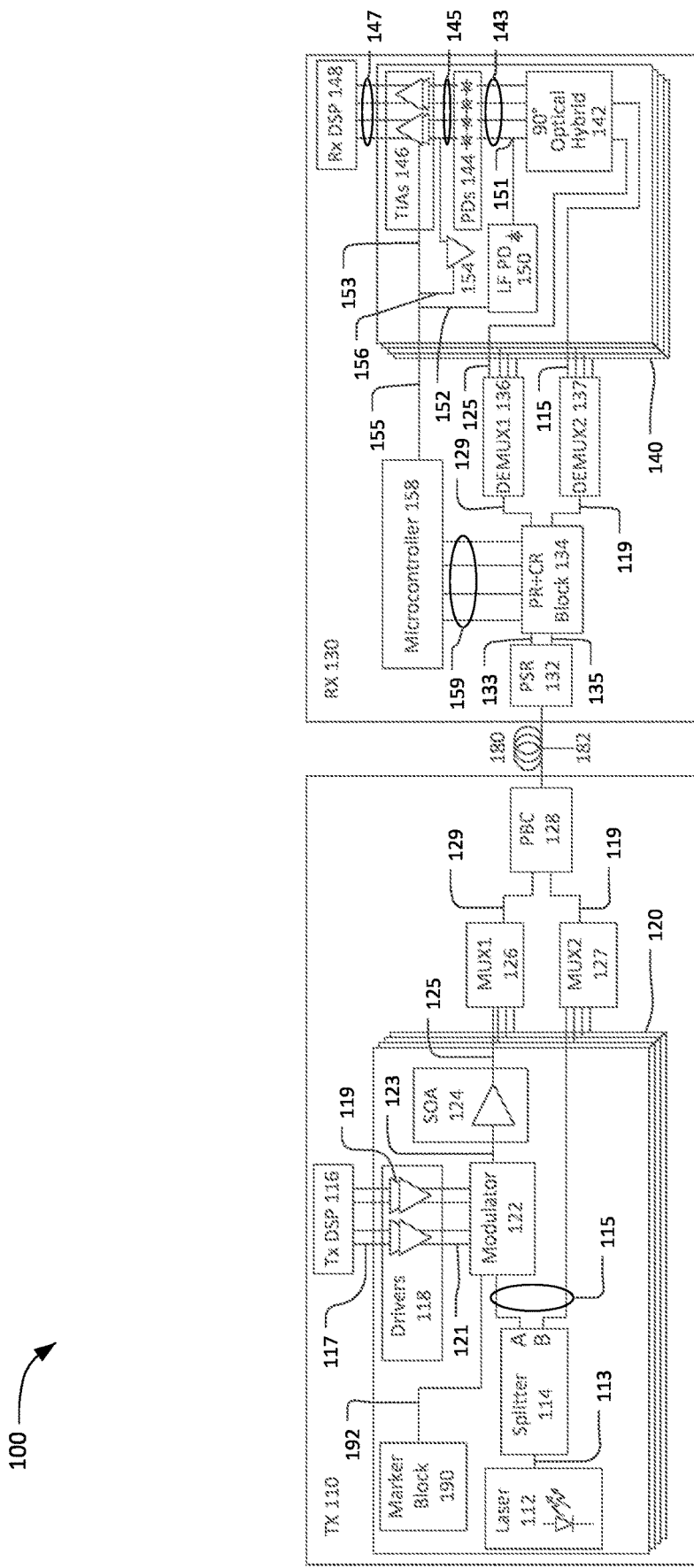
FIG. 1A is a block diagram of a system for polarization-multiplexed self-homodyne analog coherent (PM-SH-ACD) optical communications having polarization recovery (PR) and carrier recovery (CR) prior to wavelength based demultiplexing.

Throughout this description, elements appearing in figures are assigned three-digit or four-digit reference designators, where the two least significant digits are specific to the element and the one or two most significant digit may be the figure number where the element is first introduced or fabricated. An element that is not described in conjunction with a figure may be presumed to have the same characteristics and function as a previously-described or subsequently-described element having the same reference designator or two least significant digits.

DETAILED DESCRIPTION

Described herein is an implementation of an architecture for an optical communication link that employs coherent modulation/demodulation, whereby both phase and amplitude of light are modulated to transmit data across an optical fiber channel. In this coherent communication it is necessary to perform carrier recovery (CR) to demodulate the signal at the receiver. The CR may consist of phase-locking an unmodulated carrier to the received modulated signal.

One approach to carrier recovery in an optical coherent link having optical fiber channels is based on transmitting an unmodulated carrier in addition to the modulated optical signal along a parallel channel. One example of this consists of transmitting the unmodulated carrier in an orthogonal polarization on the same fiber as the modulated signal. This can be referred to as polarization-multiplexed self-homodyne (PM-SH) detection. In PM-SH, in addition to CR, the original transmitted state-of-polarization (SOP) needs to be recovered. The recovery of the initial transmitted SOP may be referred to as polarization recovery (PR). In coherent fiber optic links, CR and PR may be done using digital signal processing (DSP). Alternatively, both CR and PR may be separately demonstrated in the analog circuit domain. In analog CR, a circuit such as a Costas Loop may be employed, with a phase-frequency detector (PFD) and a loop filter that feeds back to a local oscillator to phase lock it to the carrier of the received modulated signal. In analog PR, a marker or pilot tone can be used to recover the original SOP at the TX.

The following describes architectures, systems, transmitters, receivers and processes for polarization-multiplexed self-homodyne analog coherent (PM-SH-ACD) optical communications. These PM-SH-ACD optical communications have three key differentiating innovations and/or advantages.

First, both PR and CR may be performed in the analog domain in a wavelength-multiplexed link without the need for dedicated high-frequency circuits, such as those running at 10 GHz RF. Both PR and CR may be done by maximizing the power of a pilot tone introduced to one or both of the quadratures (e.g., sine and cosine wave signals) of one of the two transmitted polarizations (e.g., 0 degree optical signal polarization and 90 degree optical signal polarization).

Two, the use of this analog PR and CR approach may enable the use of conventional commercially-available intensity-modulation direct-detection (IMDD) analog circuits—drivers and transimpedance amplifiers (TIAs)—and digital signal processors (DSPs). For example, for an 800 Gb/s 4-wavelength 50 Gbaud 16QAM implementation, the analog circuits and DSP that are employed can be the same ones that are developed for 400 Gb/s 4-wavelength (or 4-fiber) 100 Gbaud pulse amplitude modulation (PAM4) IMDD links. The use of commercially available analog circuits and DSPs from prior generation IMDD links can significantly reduce latency, power dissipation, and cost of optical transceivers.

Three, the use of this analog PR and CR approach offers backwards compatibility. Some single-fiber architectures or transceivers may transmit a total data rate of 400 Gb/s PAM4 IMDD. Specifically, a 400G FR4 standard may transmit 400 Gb/s using 4 wavelengths. An 800 Gb/s architecture herein may be backwards compatible with the 400G FR4. Some DSP-based coherent transceivers may not be backwards compatible. This is because the PR is done in the digital domain, and thus the waveguide polarization dependent losses result in a penalty which may render IMDD operation unfeasible. Furthermore, 1.6 Tb/s and 3.2 Tb/s solutions described herein may be backwards compatible with the proposed 800 Gb/s and 1.6 Tb/s solutions, respectively.

Description of Apparatus

FIG. 1A is a block diagram of a system 100 (e.g., an architecture) for polarization-multiplexed self-homodyne analog coherent (PM-SH-ACD) optical communications having polarization recovery (PR) and carrier recovery (CR) at block 134 prior to wavelength based demultiplexing at 136 and 137. System 100 includes a transmitter section or transmitter (TX) 110 transmitting optical signal 182 to fiber optic cable 180 from which a receiver section or receiver (RX) 130 receives signal 182. A system, an architecture or components thereof being described as "for" performing an action may also be "configured to" perform said action.

In general, transmitter 110 converts input electrical data signals 117 from the DSP 116 into optical signals 125. In the transmitter 110 there are one or more transmitter slices 120, each corresponding to an optical wavelength of a different wavelength laser 112 (e.g., visual color of light) of each slice, which are multiplexed at MUX1 126 and MUX2 127, after which polarization beam combiner (PBC) 128 forms polarization orthogonal optical signal 182 from the multiplexed signals. The optical signal 182 propagates across some length of optical fiber 180. At the other end of the optical fiber 180, a receiver (RX) 130 converts the optical signal 182 back into output electrical data signals 147 which include the same data as that of signals 117. The receiver 130 also has one or more slices 140 (see also slices 162 and 172 of FIGS. 1B and 1C), each corresponding to a demultiplexed optical wavelength (e.g., of a different wavelength laser 112).

Transmitter 110 is an optical transmitting component including a transmitter digital signal processor (DSP) 116 sending electrical signals 117 to each of a number of transmitter slices 120. Each TX slice 120 includes a laser 112, a splitter 114, drivers 118, modulator 122 and SOA 124. A first multiplexer (MUX1) is for receiving modulated optical signals 123 or 125 from all of the slices and sending a combination of those signals as part of signals 129 to a PBC 128. A second multiplexer (MUX2) is for receiving unmodulated optical signals 115 from all of the slices and sending a combination of those signals as part of signals 129 to the PBC 128. The PBC is for combining signals 129 into orthogonally polarized signals and sending them as signal 182 on optical fiber 180, such as a fiber optic cable.

In system 100, in transmitter 110, there is a pilot tone (PT) signal 192 added to only one quadrature of one of the slices 120 by modulator 122. Here, signal 192 is modulated onto one of quadrature I (cosine wave signals) or Q (sine wave signals) of the signals 121 that will be part of signals 123, 125 and 129 of only the modulated one of the two transmitted polarizations (e.g., 0 degree optical signal polarization or 90 degree optical signal polarization) of signal 182. In other cases, signal 192 can add to both of the quadratures of only the modulated one of the two transmitted polarizations.

In system 100, at the receiver 130, the received signal 182 first goes to the polarization splitter rotator (PSR) 132, then the PR and CR block 134, and is then demultiplexed at DEMUX1 136 and DEMUX2 137. In system 100, the amplitude of the pilot tone signal 192 can be monitored at receiver 130 using: a tap 151 directed to a low-frequency photodiode (LF PD) 150 and a resistor (the resistor maybe in blocks 150 or in controller 158); measuring a voltage signal of a dedicated transimpedance amplifier (TIA) 154; and/or by measuring the voltage signal of one of the same TIAs 146 used for data transmission. All three options may provide an output voltage signal with an amplitude based on the amplitude of signal 192. These voltage signal output options are depicted as signal 152 output from blocks 150, signal 156 output from TIA 154 and signal 153 output from one of TIAs 146, any one or more of which are represented as feedback signal 155, which may be a pilot signal measurement signal 155. Based on the signal 155, the amplitude of the pilot tone signal 192 is measured using a microcontroller (μC) 158, which may perform a PR and CR algorithm for or of block 134. This measurement and/or feedback signal 155 may be based on selecting any one or more of signals 152, 156 and/or 153. In some cases, the measurement is an aggregate or other combination of two or more of signals 152, 156 and/or 153.

In more detail, each TX slice 120 contains a laser 112 that is operated at a constant output power at a particular wavelength (e.g., color) that is different for each Tx slice 120. The constant laser output 113 is also referred to as continuous-wave (CW). Laser 112 may be a coherent light source for outputting a laser light 113 having one frequency and one phase to a splitter 114.

The laser output signal 113 is optically split into two paths by the splitter 114. The power split signals 115 can be equal or unequal power among the two output paths. In some cases, splitter 114 is for creating two equal power outputs 115 of the laser light 113. In FIG. 1A, the splitter's upper output signal is directed to an electro-optic modulator 122 and lower output signal is directed to an optical wavelength multiplexer (MUX2) 127.

An input data signal (not shown), which is composed of one or multiple parallel electrical data streams, is processed by a transmitter digital signal processor (DSP) 116. The DSP output 117 signal can be or include one or several parallel electrical channels, such as the 4 parallel channels shown. There may be fewer or more than 4 parallel channels. Each DSP output channel is in one of various modulation formats, such as non-return to zero (NRZ) or 4-level pulse amplitude modulation (PAM4). The DSP outputs 117 are connected to the inputs of modulator drivers 118, which may be voltage amplifiers 119 that amplify or QPSK modulate signal 117 into signals 121. The modulator driver output electrical signals 121 are directed to electro-optic modulators 122.

The electro-optic modulators 122, such as Mach-Zehnder modulators (MZM), convert the voltage signals 121 into an optical signal 123. The modulators are biased such that the output optical signal 123 is phase-modulated in a format such as quadrature phase shift keying (QPSK) or 16-ary quadrature amplitude modulation (16QAM). In the case of a MZM, the modulator is biased at the null-transmission point to produce a phase-modulated signal 123. In the case of a phase-modulated signal, the modulation may give QPSK phase values for two optical signals per quadrature, I+/− and Q+/− as optical signal 123.

Additionally, a marker or pilot tone (PT) signal 192 from tone generator 190 is added to one or two of the quadratures of modulators 122 for PR and CR at the receiver 130, 160 or 170. Modulators 122 may add the PT signal 192 to only one quadrature, such as I− cosine wave signals or Q− sine wave signals of the signals 121 of each of the slices 120. In other cases, a signal 192 can add to both of the quadratures (e.g., sine and cosine wave signals) of the modulated one of the two transmitted polarizations. Each of the two tone signals 192 may be at different frequencies in order to distinguish them at receiver 130. Modulator 122 may be an optical modulator for outputting an optical modulated data signal 123 (such as having 2 optical quadrature component signals (I+, Q+) of the output of the laser light 115 modulated with a data signal 121 and one or two pilot tone signal(s) 192 identifying the polarization of the modulated signal 123. In some cases, data signal 121 may be QPSK or IMDD.

While the data signal 117 or 121 may be in a 10 GHz range (e.g., 5-30 GHz, in the case of a 50 Gbaud embodiment), the PT signal 192 may be in the 1 MHz range (e.g., 0.5-10 MHz). The data signal 117 or 121 may be at a frequency that is at least 500× or 1000× the frequency of the signal 192.

The PT signal 192 may have an inconsequential amount of power as compared to the data signal 121 or 123, such as with respect to the function of block 134, DEMUXs 136 and 137, hybrid 142, PDs 144, TIAs 146 and DSP 148. The PT signal 192 may have between 1 and 10 percent of the power of signal 121 or 123. It may have 5 percent of the power of signal 121 or 123.

The modulated signal 123 may then be amplified using an optical amplifier such as a semiconductor optical amplifier (SOA) 124 and is then directed as amplified signal 125 to an optical wavelength multiplexer (MUX1) 126. SOA 124 may represent at least one SOA of transmitter 110 at and amplifying at least one of the signal 123 (as shown), the signal 115, the signal 129 and/or the signal 119. In some cases, SOA 124 does not exist.

MUX1 126 and MUX2 127 are optical multiplexers, such as arrayed waveguide gratings (AWG). Multiplexer 126 takes multiple optical input signals 125, one from each of the slices 120, and combines the signals 125 into a single optical waveguide signal 129. Multiplexer 127 takes multiple optical input signals 115, one from each of the slices 120, and combines the signals 115 into a single optical waveguide signal 119. Each input signal 125 and 115 corresponds to one TX slice 120, each of which utilizes a unique carrier wavelength of signal 115. MUX1 126 multiplexes the modulator output signals 125 of all the slices 120 and MUX2 127 multiplexes the unmodulated carrier signals that correspond to the splitter's output signals 115 of all the slices 120. MUX1 126 may be a multiplexer for combining the optical modulated data signals 125 of the slices 120 into a combined optical modulated data signal 129; and MUX2 127 may be a multiplexer for combining the laser light signals 115 of the slices 120 into a combined optical carrier signal 119.

The optical output signals 129 and 119 of MUX1 126 and MUX2 127 are typically in the same polarization. In that case, polarization beam combiner (PBC) 128 rotates one of the multiplexer output signals 129 or 119 to an orthogonal polarization and then combines the signals 129 and 119 (one having orthogonal polarization as compared to the other). Rotating may be rotating one of signals 129 or 119 to have an optical polarization that is 90 degrees different than that of the other signal of signals 129 or 119. The optical signal 182 at the output of the PBC 128 is thus a wavelength-multiplexed dual-polarization signal. This output signal 128 is then coupled to a fiber 180 for transmission to the receiver 130. PBC 128 may be for polarization rotating by 90 degrees (e.g., orthogonally) one of the combined optical modulated data signal 129 or the combined optical carrier signal 119; for combining into a polarized signal 182, the polarization rotated one of and the other of the combined signals 129 and 119; and for transmitting to a fiber optic cable 180 the polarized signal 182.

The modulated signal 125, having PT signal 192 is in only one of the two transmitted polarizations of signal 182. It may be in only signal 129 of signal 182 having a 0 degree optical polarization or a 90 degree optical polarization, while the other signal 119 has the other polarization. It may be in signal 129 while signal 119 has an orthogonal polarization compared to signal 129.

Cable 180 may be fiber optic or optical cables. It may be between a few feet and thousands of miles in length. It may extend between ten miles and hundreds of miles.

Receiver 130 is an optical receiving component including a receiver polarization splitter rotator (PSR) 132 for receiving from cable 180 and combining the orthogonal polarized signal 182 into parallel orthogonal signals 133 and 135 which have their polarity and carrier recovered at PR and CR (e.g., PR plus CR) block 134, which outputs optically demodulated data signal and carrier signals 135. PR and CR at block 134 is controlled or performed by microcontroller 158 which receives feedback signal 155 based on the amplitude and signs of the pilot tones signal 192. Signals 135 are demultiplexed at DEMUX1 136 and DEMUX2 137 which send optical signals 139 to each of a number of receiver slices 140. Receiver digital signal processor (DSP) 148 receives electrical signals 147 from each of the slices 140. Each slice 140 may be an optical signal to electrical signal converter. In some cases, it may convert to QPSK or to IMDD.

Each RX slice 140 includes a 90 degree optical hybrid 142, photodiodes 144, and TIAs 146. Each RX slice 140 also includes a tap 151 directed to an LF PD 150 and a resistor in blocks 150 or controller 158; and/or a dedicated TIA 154. It also includes feedback signals 152, 156 and/or 153, any one or more of which are represented as feedback signal 155 to microcontroller (μC) 158.

In more detail, the received optical signal 182 from cable 180 is coupled to the receiver 130 and directed to PSR 132.

The PSR 132 receives signal 182 with two orthogonal polarizations, which include all or parts of signals 129 and 119, one orthogonally polarization to the other. The PSR 132 splits then rotates the two orthogonal polarizations to two same polarization signals 133 and 135 which the receiver waveguides are designed for. Rotating may be rotating one of polarization orthogonal signals 133 or 135 to have an optical signal polarization that is the same as that of the other signal of signals 133 and 135.

Signal 182 includes signals 129 and 119, one orthogonally polarization to the other. Thus, each of signals 133 and 135 includes a part of both signals 129 and 119, because the PSR 132 does not know the exact polarization of either or both of signals 129 and 119, but has split off a randomly polarized pair of orthogonally polarization signals from signal 182, and rotated one of those split off signals. Each of the randomly polarized pair of signals 133 and 135 will have part of signal 129 and part of signal 119. The two output signals 133 and 135 are routed towards PR and CR block 134. PSR 132 may be for receiving the polarized signal 182; polarization un-rotating by 90 degrees the polarized signal 182 into same polarized optical signals 133 and 135, each having some of the combined laser light signals 119 and some of the combined optical modulated data signals 129.

Polarization recovery of signals 129 and 119 from signals 133 and 135 happens at PR and CR block 134. The state-of-polarization (SOP) of signal 182 undergoes random time-varying rotations as it propagates along fiber 180. For that reason, it is necessary to de-rotate the received SOP to recover the transmitted signals 129 and 119. The PR and CR block 134 receives the rotated SOP of signals 133 and 135, and outputs the original transmitted SOP with phase-locked unmodulated carrier signal 119 and phase-locked modulated (with data signals 121) carrier signal 129. The PR and CR block 134 is or includes 8 phase shifters and 4 couplers; and is described further at FIG. 2. Block 134 may be a reset-free polarization controller and carrier recovery based on phase shifters.

PR and CR block 134 includes a polarization recover (PR) component for recovering the polarization of the polarized optical signals 133 and 135 using a received polarization recovery signal 159 from the microcontroller 158, to recover a polarization fixed optical signal 129 having the data signal 121 and pilot tone signal 192 optically modulated with the laser light 115 and to recover a polarization fixed optical signal having the laser light 115, where signals 129 and 115 have the same fixed polarization.

By implementing the closed-loop control described above, both PR and CR can be performed in the same block 134, such as at the same time. PR and CR block 134 also includes a carrier recovery (CR) component for: (a) recovering the frequency and phase of the second output of the laser light from the polarization fixed second optical signal; (b) demodulating the polarization fixed first optical signal into a polarization and frequency fixed first optical signal having the data signal and the pilot tone signal; and (c) demodulating the polarization fixed second optical signal into a polar, frequency and phase fixed second optical signal having or that is the second output of the laser light. Recovering the frequency and phase may be done using pairs of phase shifters and phase couplers as noted in FIG. 2; and/or be using the received carrier recovery signal (e.g., signal 159) from the microcontroller 158. In some cases, demodulating at (a) above is not performed. In some cases, the carrier recovery signal is or is based on a received polarization recovery signal.

DEMUX1 136 and DEMUX2 137 are optical demultiplexers, such as arrayed waveguide gratings (AWG). The demultiplexers take a single optical input and separate it into multiple optical outputs, each corresponding to a different carrier wavelength. Each output corresponds to one RX slice of slices 140. Demultiplexer 136 takes a single optical waveguide signal having combined data signals 129 for all slices 140 and splits signal 129 into multiple optical signals 125, one for each of the slices 140. Demultiplexer 137 takes a single optical waveguide signal having combined carrier signals 119 for all slices 140 and splits signal 119 into multiple optical signals 115, one for each of the slices 140. Each signal 125 and 115 corresponds to one RX slice 140, and each has a unique carrier wavelength (color) of signal 115. DEMUX1 136 and DEMUX1 137 may be for splitting each of the optical signals 129 and 119 into a number of polarized optical signals for the receiver slices 140.

Although not shown, the receiver 130 may have at least one SOA at and amplifying at least one of the signal 129, the signal 119, the signal 125 and/or the signal 115. In some cases, none of these SOAs exist (as shown).

A 90 degree optical hybrid 142 takes both the unmodulated signal 115 and the modulated signal 125 from the output of the PR and CR block 134 and outputs 4 optical signals 143 corresponding to the desired vectorial additions of the two input optical fields. Namely, hybrid 142 outputs two optical signals per quadrature, which may be the 4 quadrature signals I+ and I– (cosine wave quadrature signals) and Q+ and Q– (sine wave quadrature signals). In some cases, hybrid 142 outputs one optical signal per quadrature, which may be the 2 quadrature signals I+ and Q+.

The hybrid 142 may be for splitting the polarization and frequency fixed optical signals 125 and 115 into 4 optical quadrature component signals (I+, I–, Q+, Q–). While the modulator 122 may only generate one optical signal 123 consisting of two quadratures I and Q; the 90-degree hybrid 142 may output 4 separate optical signals 143 by effectively splitting the (e.g., two quadrature) inputs into 4 paths and interfering the signals in those 4 paths. In the I+ path of signals 143, no phase difference is added between the two input signals and the signals are interfered as is. In the I– path of signals 143, a 180-degree phase difference is added between the signals and the signals are interfered. In the Q+ path of signals 143, the phase difference is 90 degrees; and in the Q– path of signals 143 the phase difference is 270 degrees.

The four output signals 143 of the hybrid 142 are directed to differential photodiodes (PDs) 144. Each of the PDs 144 converts the optical field of one of signals 143 into an electrical photocurrent of electrical signals 145 that is proportional to the received signal power of the one signal of signals 143. The optical field to photocurrent conversion mixes the unmodulated and modulated signals and demodulates the phase-modulated signal. This demodulation gives the QPSK phase values for the two optical signals per quadrature, I+/– and Q+/– as electrical current of signals 145. The optical field to photocurrent conversion may be for converting at the frequencies of the data signals 117 or 121, which may be around 10s of 10 GHz, 30 GHz for 50 Gbaud, or around 60 GHz for 100 Gbaud. This conversion may not be for conversion at the frequency of the PT signal 192 (e.g., around 1 MHz). The 4 PDs 144 may be for converting the 4 optical quadrature component signals 143 into 4 electrical current quadrature signals 145.

The photocurrent signals 143 are then converted to voltage signals 147 using TIAs 146, which output the signals 147 to the receiver DSP 148. TIAs 146 may be two TIAs for converting the 4 electrical current quadrature signals 145 into 4 electrical voltage quadrature data signals 147.

The receiver DSP 148 processes the voltage signals 147 received from the TIAs 146 to recover the original data signals 117 or 121 transmitted by the TX DSP 116. DSP 148 may be an Rx DSP for decoding or extracting the data signal from the 4 electrical voltage quadrature data signals 147.

One, two or up to all four of the four hybrid output signals 143 may have an optical tap 151 that is directed to a low frequency photodiode (LF PD) of block 150 to measure the amplitude of one, two or up to four of the PR+CR marker tone signals 192 in signals 143. Each of taps 151 may divert an inconsequential amount of the optical signals 143 with respect to the function of PDs 144's conversions. The taps may divert between 0.1 and 5 percent of the optical power of signals 143.

Each LF PD may convert the low frequency (e.g., around 1 MHz; or between 0.1 MHz and 10 MHz) optical field of one of signals 143 into an electrical photocurrent of electrical signal 152 that is proportional to the received signal power of the PT signal 192 of the tapped one of signals 143. The optical field to photocurrent conversion may be for converting at the frequency of the PT signal 192. It may not be for conversion at the frequencies of the data signals 117 or 121. The LF PD may output across a resistor of block 150 or controller 158 to provide a voltage signal 152 that is proportional to the received signal power of the PT signal 192. Although only one set of tap 151, block 150 and signal 152 is shown for convenience there may be one set tapping two or each of the signals 143 and the signals 152 of those sets may be part of signal 155.

The amplitude of the PR+CR marker tone signal 192 in one, two or up to all four of signals 145 may be measured by measuring a voltage signal of one, two or up to all four dedicated transimpedance amplifiers (TIAs) 154, one for each of the measured signals 145. Each TIA 154 output may be monitored to measure the amplitude of the pilot tone signal 192 to perform PR+CR. Each TIA 154 may output a voltage signal 156 that is proportional to the received signal power of the PT signal 192 in one of the electrical signals 145. Although only one TIA 154 is shown outputting signal 156 for convenience; two or up to four TIAs 154 may exist to monitor two or each of the signals 145, and each of the TIAs output signals 156 may be part of signal 155.

Also, one, two or up to four of the TIA 146 outputs may be monitored to measure the amplitude of the pilot tone signal 192 to perform PR+CR. The amplitude of the PR+CR marker tone signal 192 in one, two or up to all four of signals 145 may be measured by measuring a voltage signal of one or more of TIAs 146. Each TIA 146 may output a voltage signal 153 that is proportional to the received signal power of the PT signal 192 in one of the electrical signals 145. Although only one TIA 146 is shown with its output being monitored and outputting signal 153 for convenience; two or up to all four TIAs 146 may have their outputs monitored for two or each of the signals 145, and each of the TIAs output signals 153 may be part of signal 155.

Each of the two or up to four tone signals 192 may be at different frequencies in order to distinguish them at each of the different ones of tap 151 and blocks 150; TIAs 154; and/or TIAs 146. Each of the different ones may be tuned to receive only one frequency of the signals 192 generated by tone generator 190, and modulated onto signal 123 by modulator 122. The signal 192 measurements by TIAs 154 and 146 may be for measuring at the frequency of the PT signal 192. They need not be for measuring at the frequencies of the data signals 117 or 121.

Each of the three options (tap 151 and blocks 150; TIAs 154; and/or TIAs 146) provide an output voltage signal with an amplitude based on the amplitude of signal 192. These voltage signal output options are depicted as signal 152 output from blocks 150, signal 156 output from TIA 154 and signal 153 output from one of TIAs 146, any one or more of which are represented as feedback signal 155. Based on the signal 155, the amplitude of the pilot tone signal 192 is measured using a microcontroller (μC) 158, which may perform a PR and CR algorithm for or of block 134. This measurement may be based on selecting any one or more of signals 152, 156 and/or 153. In some cases, the measurement is an aggregate or other combination of two or more of signals 152, 156 and/or 153. Each of the three options for measuring the amplitude of signal 192 may be a polarization detector for detecting (e.g., measuring, monitoring and/or determining) a polarization of the pilot tone signal 192 to identify a polarization of the modulated signal 129 having signal 192, and for outputting the pilot signal measurement signal 155 to the microcontroller 158 based on the detected polarization. Signal(s) 155 can then be used by controller 158 to determine or calculate signals 159 for controlling block 134 or 200.

Microcontroller 158 may be for sending the polarization recover signal 159 (which may also include a carrier recovery signal) to block 134 based on the received feedback signal 155. PR and CR at block 134 is controlled or performed by microcontroller 158 through signals 159. Controller 158 may perform a PR and CR algorithm, which the functionality of block 134 is based upon, such as using hardware, BIOIS, RAM, software or any combination thereof of controller 158.

The microcontroller 158 may output an analog signal (e.g., as signal 159) using a digital to analog converter (DAC) or a pulse-width modulation (PWM) module. The DAC or PWM modules can be built into the microcontroller or can be external components that the microcontroller interfaces with (not shown). This analog voltage signal may either directly drive the phase shifters of block 134, or indirectly by using external drivers that amplify the voltage and/or increase the range of the current delivered to the phase shifters. The phase shifters may be thermo-optic phase shifters or electro-optic phase shifters.

FIG. 8A is an example of equations 804 for how to obtain error signal e(t) for a polarization closed-loop control block, such as used by controller 158 and/or block 134. FIG. 8A shows four equations 832 that can be solved to obtain error e(t) for each degree of freedom (e.g., of polarization) of a transfer function for closed-loop polarization control, such as used for polarization demultiplexing and carrier recovery where the controller 158 and fiber 180 transfer functions satisfy TControllerTFiber=±I. FIG. 8A also shows components of receiver 130 with two sets of tap 151 and block 150; and phase shifter control signals 159 from controller 158 to each of the phase shifters of block 134.

FIG. 8B is an example of Jones matrices 806 for proportional, integral, derivative (PID) tuning of the phase shifters and couplers of block 134 using equations 804, such as used by controller 158 and providing control of block 134 by signals 159. Matrices 806 include phase shifter matrix 842 for tuning or controlling the phase of shifters $\Phi_1$-$\Phi_4$ and $\Phi_1'$-$\Phi_4'$. Matrices 806 also include phase coupler matrix 844 for tuning or controlling the and the phase coupling of couplers 216, 226, 236 and 246.

In some cases, two signals 192 are added to signal 123 by modulator 122, one in each of quadratures I and Q of signal 123. In these cases, the following can be measured to obtain the polarization recovery error: 1) amplitude of the two tone signals 192 in their desired channels (e.g., I tone signal 192 in I channel, and Q tone signal 192 in Q channel), 2) amplitude of the tone signals 192 in the undesired channels (I tone signal 192 in Q channel, Q tone signal 192 in I channel), and 3) The sign of the 4 tone signals 192 (in phase (0 degree) or out of phase (180 degree)). Each of these measurements can be performed (e.g., in the 2 quadratures) by one or more of tap 151 and blocks 150; TIAs 154; and/or TIAs 146 which output the measurements as signals 152, 156 and/or 153 (e.g., signal 155) to controller 158. With this information, a linear system of 4 equations is obtained, such as by controller 158.

Solving the equations 804 or 832, such as at controller 158, gives the combined Jones matrix 806 of the Fiber (e.g., TFiber) and PR+CR (e.g., TController). Notably, Jones matrix 842 can be used for the phase shifters and matrix 844 can be used for the (2×2) phase couplers to describe how optical elements modify the state of polarization of polarized light. Because the PR+CR phase shifter values of matrix 842 are known, another system of 4 equations can be solved to obtain the Jones matrix of only the Fiber. Each Jones matrix may contain 3 degrees of freedom, which correspond to the phase shifts set in the PR+CR block 200/134. Therefore, three error signals can be obtained by subtracting each of the three angles Error1=FiberAngle1−PRCRAngle1, and so on, such as of equations 804. The three error signals are fed into a controller, i.e. a PID controller, in order to generate the drive signal (such as signals 159) for the phase shifters $\Phi_1$-$\Phi_4$ and $\Phi_1'$-$\Phi_4'$.

Each of the two or up to four tone signals 192 may be at different frequencies in order to distinguish them at receiver 130. By eliminating the errors of error signals e(t) for each degree of freedom, both PR and CR can be performed simultaneously. So, the marker tones may be used to do PR and CR.

Figure 1B:
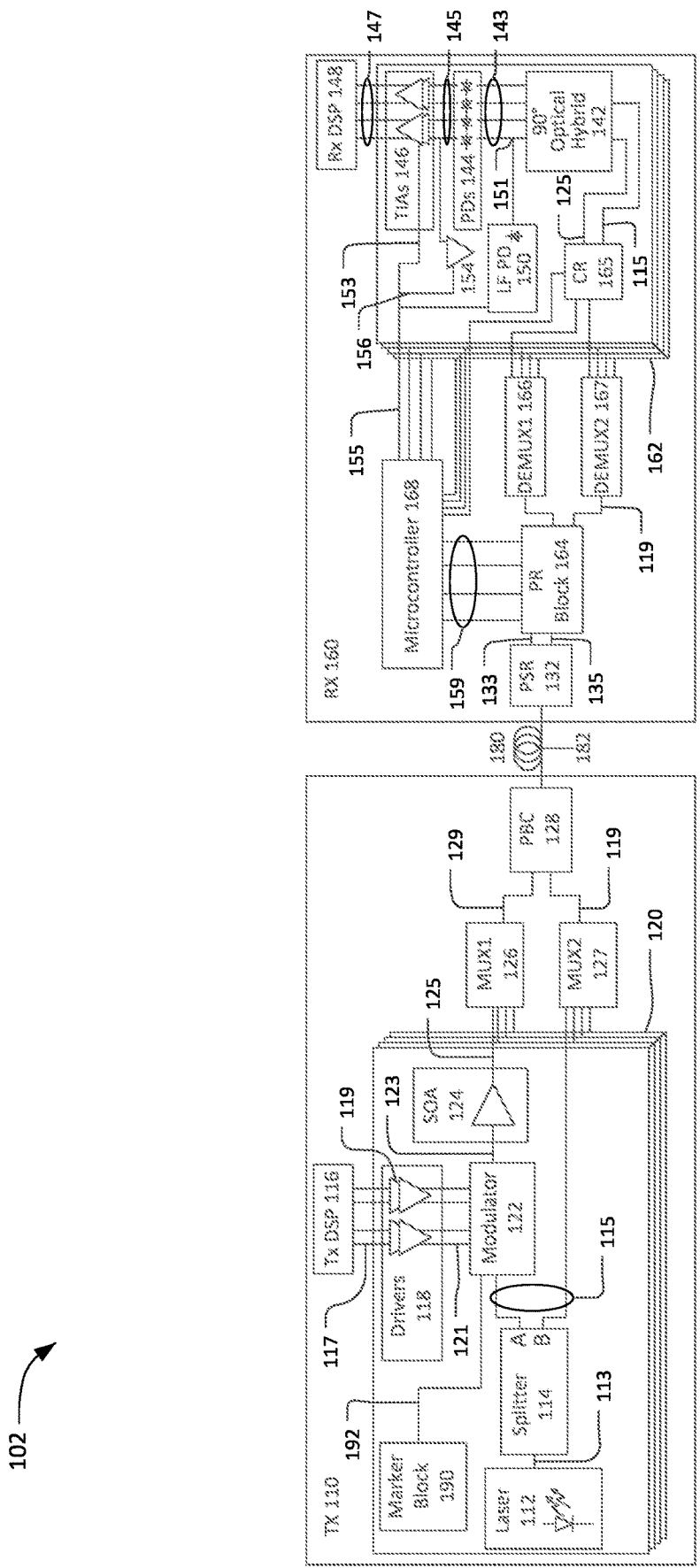
FIG. 1B is a block diagram of a system for PM-SH-ACD optical communications having PR prior to and CR after wavelength based demultiplexing.
Figure 1C:
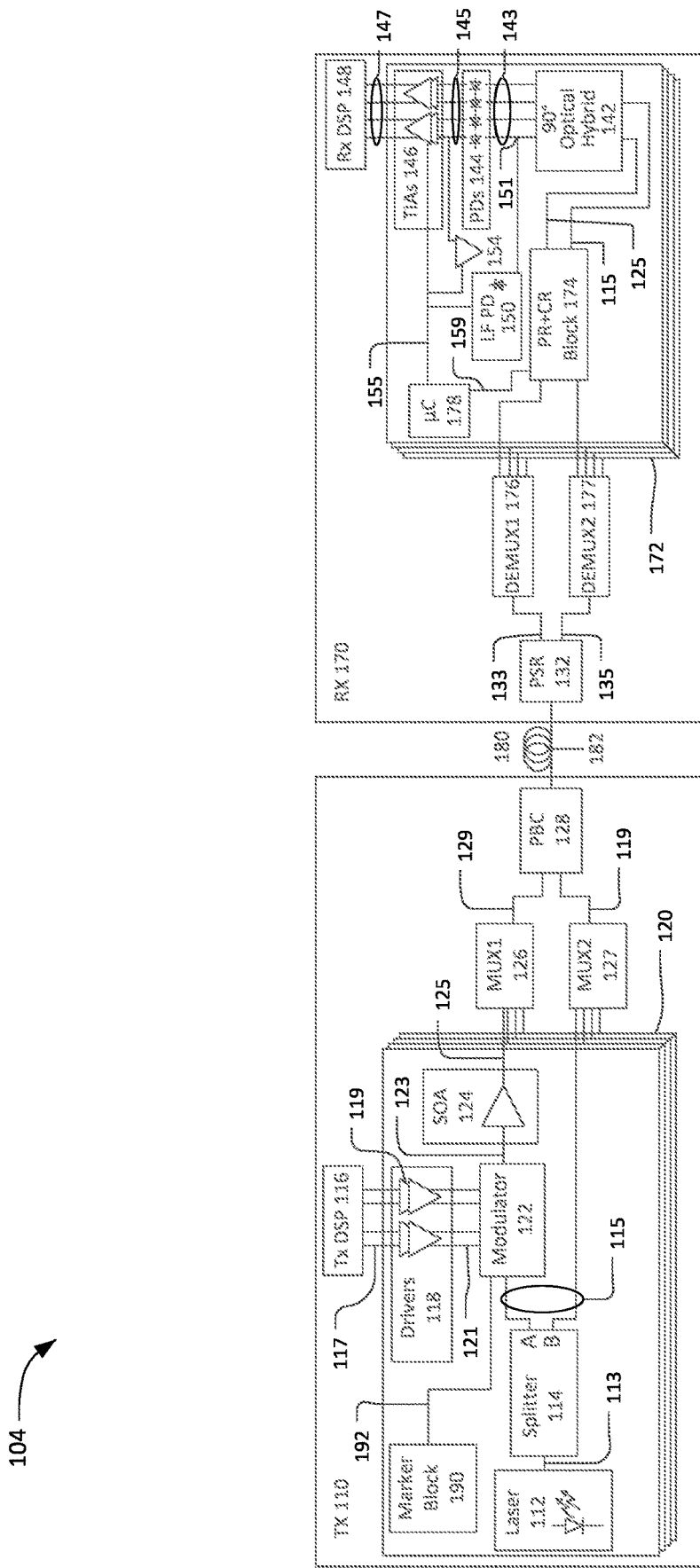
FIG. 1C is a block diagram of a system for PM-SH-ACD optical communications having PR and CR after wavelength based demultiplexing.

In FIG. 1A, both polarization recovery (PR) and carrier recovery (CR) at block 134 are performed before demultiplexing (at DEMUX1 136 and DEMUX2 137). FIG. 1B is a block diagram of a system 102 for PM-SH-ACD optical communications having polarization recovery (PR) at 164 prior to and carrier recovery (CR) at 165 after wavelength based demultiplexing at 166 and 167. FIG. 1C is a block diagram of a system 104 for PM-SH-ACD optical communications having polarization recovery (PR) and carrier recovery (CR) at 172 after wavelength based demultiplexing at 176 and 177.

In the three variants of a general communication link architecture shown as systems 100, 102 and 104, the transmitter 110 part of the link/system is identical, and the receivers 130, 160 and 170 differ as shown. The components or blocks that are included in all of the variants were first described in a certain order for the variant of FIG. 1A. However, the other variants FIGS. 1B and 1C may use the same blocks with the order of the blocks changed for each variant.

In system 102, PR is performed at block 164 before demultiplexing is performed at DEMUX1 166 and DEMUX2 167. After demultiplexing, CR is performed at block 165 within each of slices 162. In this variant, the tone signal 192 is measured in each of slices 162 and is fed back to the microcontroller 158 using feedback signals 169 from each of slices 162. Each of signals 169 may be similar to signal 155 but be for one specific slice. Measuring the tone signal 192 in each of slices 162 and feeding back signals 155 to the microcontroller 158 using feedback signals 169 may include or be using one or more of the three options (tap 151 and blocks 150; TIA 154; and/or using TIAs 146) in each slice as described for system 100. Systems 100 and 102 are compatible with broadband optical switching. In telecommunications, broadband is the wide-bandwidth data transmission that transports multiple signals at a wide range of frequencies and Internet traffic types, which enables messages to be sent simultaneously and is used in fast internet connections. In the context of Internet access, broadband is used to mean any high-speed Internet access that is always on and faster than dial-up access over traditional analog or ISDN PSTN services.

In system 104, the demultiplexing at DEMUX1 176 and DEMUX2 177 is performed before both PR and CR are performed at block 174 within each of slices 172. Here, each of slices 172 contains a PR+CR block 174. In this variant, the tone signal 192 is measured and is fed back to the microcontrollers 178 using feedback signals 155 in each of slices 172. Measuring the tone signal 192 in each of slices 172 and feeding back signals 155 to the microcontrollers 178 may include or be using one or more of the three options (tap 151 and blocks 150; TIA 154; and/or using TIAs 146) in each slice as described for system 100. System 104 is compatible with both broadband optical switching and wavelength-dependent optical switching. Wavelength-dependent optical switching may route (switch) signals between optical fibers on a per-wavelength basis or may us wavelength-division multiplexing (WDM) which multiplexes a number of optical carrier signals onto a single optical fiber by using different wavelengths (i.e., colors) of laser light. This technique enables bidirectional communications over a single strand of fiber, also called wavelength-division duplexing, as well as multiplication of capacity.

Figure 2:
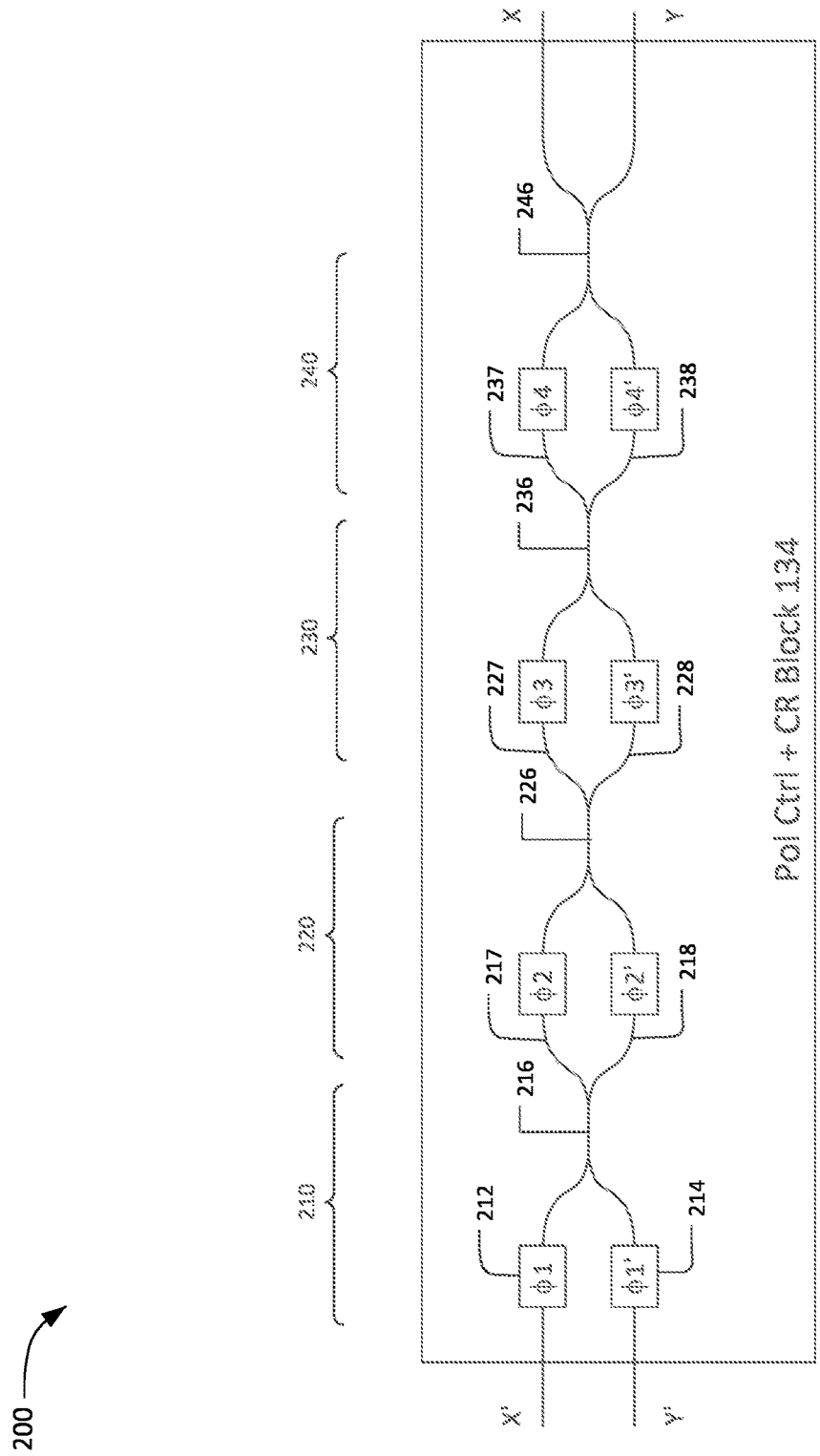
FIG. 2 is a schematic diagram 200 of combined PR and CR block that includes 8 phase shifters and 4 phase couplers.

FIG. 2 is a schematic diagram 200 of combined PR and CR block 134 that includes 8 phase shifters and 4 phase couplers. Block 134 may be a reset-free polarization controller and carrier recovery based on phase shifters.

Block 134 has input signal X' (e.g., for cosine or I waves), which corresponds to one of the two received polarizations in the signal 182 at the input of block 132, to a first phase shifter (($\Phi_1$) which shifts signal X' to a X" phase shifted signal. Block 134 has input signal Y' (e.g., for sine or Q waves), which corresponds to the other of the two received polarizations in the signal 182 at the input of block 132, to a second phase shifter ($\Phi_1'$) which shifts signal Y' to a Y" phase shifted signal. Then, phase coupler 216 couples the phase shifted signals from shifters ($\Phi_1$) and ($\Phi_1'$) and outputs split signals 217 and 218, where signal 217 has a 90 degree phase shift as compared to signal 218.

Next, the split signal 217 output from coupler 216 is an input signal to a third phase shifter ($\Phi_2$) which shifts signal 217 to a signal 217" phase shifted signal and the split signal 218 is an input signal to a fourth phase shifter ($\Phi_2'$) which shifts signal 218 to a signal 218" degree phase shifted signal. Then, phase coupler 226 couples the phase shifted signals from shifters ($\Phi_2$) and ($\Phi_2'$) and outputs split signals 227 and 228, where signal 227 has a 90 degree phase shift as compared to signal 228.

Then, the split signal 227 output from coupler 226 is an input signal to a fifth phase shifter ($\Phi_3$) which shifts signal 227 to a signal 227" degree phase shifted signal and the split signal 228 is an input signal to a sixth phase shifter ($\Phi_3'$) which shifts signal 228 to a signal 228" degree phase shifted signal. Then, phase coupler 236 couples the phase shifted signals from shifters ($\Phi_3$) and ($\Phi_3'$) and outputs split signals 237 and 238, where signal 237 has a 90 degree phase shift as compared to signal 238.

Next, the split signal 237 output from coupler 236 is an input signal to a third phase shifter ($\Phi_4$) which shifts signal 237 to a signal 237" degree phase shifted signal and the split signal 238 is an input signal to a fourth phase shifter ($\Phi_4'$) which shifts signal 238 to a signal 238" degree phase shifted signal. Then, phase coupler 246 couples the phase shifted signals from shifters ($\Phi_4$) and ($\Phi_4'$) and outputs split signal outputs of block 134 as outputs X and Y, where signal X has a 90 degree phase shift as compared to signal Y.

In some cases, the PR and CR block 134 includes four sets 210, 220, 230 and 240, each of 2 phase shifters (e.g., 212 and 214) and 1 coupler (e.g., 216), each of the 2 phase shifters for phase shifting a separate input into a separate phase shifted output, and each of the 1 coupler for coupling the separate outputs of the 2 phase shifters into a coupled signal output. In this case, separate inputs of 2 phase shifters of a first set of the four sets can be for receiving the first and second polarized optical signals; and separate inputs of 2 phase shifters of a second, third and fourth set of the four sets are for receiving the coupled signal output from the 1 coupler of a prior set of the four sets.

In some cases, each pair of phase shifters ($\Phi_X$) and ($\Phi_X'$) of diagram 200 introduce a relative phase between their two output paths; and the 2×2 couplers (e.g., coupler 2×6) of diagram 200 split half the power of each input arm from those two shifters equally at the output (e.g., half of the power goes to each output 2×7 and 2×8) and also introduce a 90 degree relative phase between those 2 outputs. Together, the concatenated blocks 210, 220, 230 and 240 allow the PR+CR block 134 to produce a reset-free arbitrary Jones matrix to recover both the polarization and recover the carrier. This Jones matrix may be Jones matrices 842 having matrix 842 for the shifters and 844 for the couplers.

Figure 3:
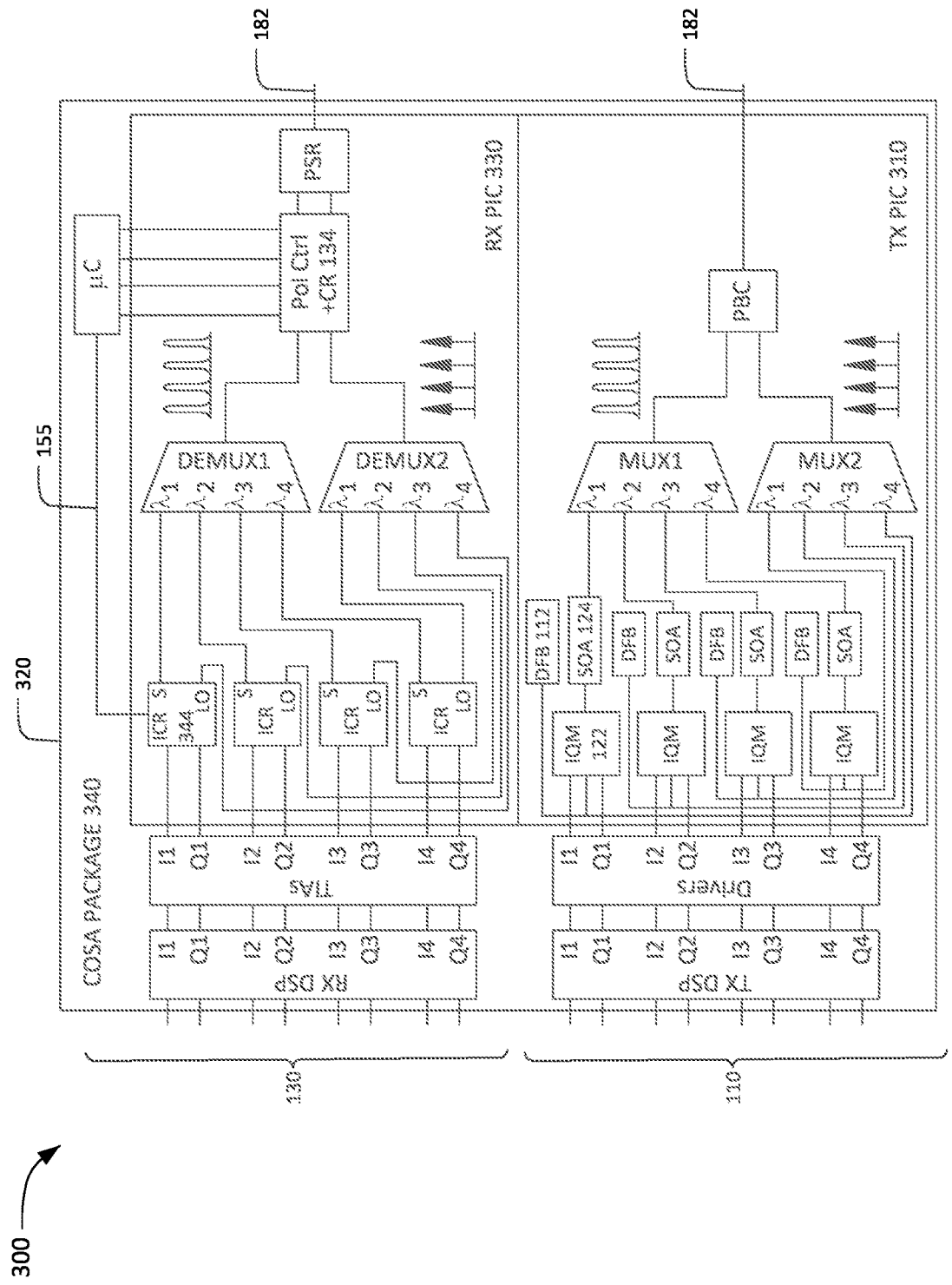
FIG. 3 is a schematic diagram of an architecture for PM-SH-ACD optical communications having PR and CR prior to wavelength based demultiplexing.

Diagram 200 may be divided into a separate PR section 164 and CR section 165, such as noted for FIG. 1B. In this case, diagram 200 can change by separating block 240 from 200 and utilizing block 240 as a standalone CR block 165 as a CR section 165 for each slice 162, while using the sections 210, 220, 230 as PR block 164 for all slices 162. Additionally, a pair of phase shifters may be used to create block 165 for CR, and another two or three phase sifters for PR. FIG. 1B, the controller 158 may use signals 155 to calculate or create signals 159 to be sent to blocks 164 and 165, In some cases, diagram 200 may be of combined PR and CR block 174 of FIG. 1C. Here, diagram 200 may also be unmodified and all the sections 210, 220, 230, and 240 may be used together at block 174. For FIG. 1C, the controller 158 may use signals 155 to calculate or create signals 159 to be sent to each of blocks 178 of slices 172, FIG. 3 is a schematic diagram of one embodiment of an architecture 300 for PM-SH-ACD optical communications having PR and CR at block 134 prior to wavelength based demultiplexing at DEMUX1 136 and DEMUX2 137. Architecture 300 may be system 100.

The electro-optic transceiver of architecture 300 is assembled on top of a substrate 320 such as a printed circuit board (PCB) or a semiconductor carrier. The entire assembly of architecture 300 is referred to as a coherent optical subassembly (COSA) 340. The COSA consists of a receiver (RX) photonic integrated circuit (PIC) 330 and a transmitter (TX) PIC 310, analog electronics (TIAs 146, Drivers), DSP 148 and a μC 158. The COSA 340 components are interconnected using bond wires, flip-chip, vias, and/or electrical traces, such as shown by the lines connecting the different components of the architecture 300. The PICs may be fabricated on a material such as silicon, indium phosphide (InP), or lithium niobate (LiNbO$_3$).

This particular embodiment of architecture 300, provides the benefits that it utilizes four multiplexed wavelengths, requires no waveguide crossings, and utilizes distributed feedback (DFB) lasers 122. The integrated-coherent receiver (ICR) blocks 344 contain optical 90-degree hybrids 142 and PDs 144. The IQMs 122 are IQ-modulators.

Systems 102 and 104 may also be on a substrate 320, referred to as a COSAs, have PICs, analog electronics, DSPs, μCs, interconnections, fabrication material, utilizes four multiplexed wavelengths, require no waveguide crossings and/or utilizes distributed feedback (DFB) lasers similar to the description for architecture 300.

Figure 4:
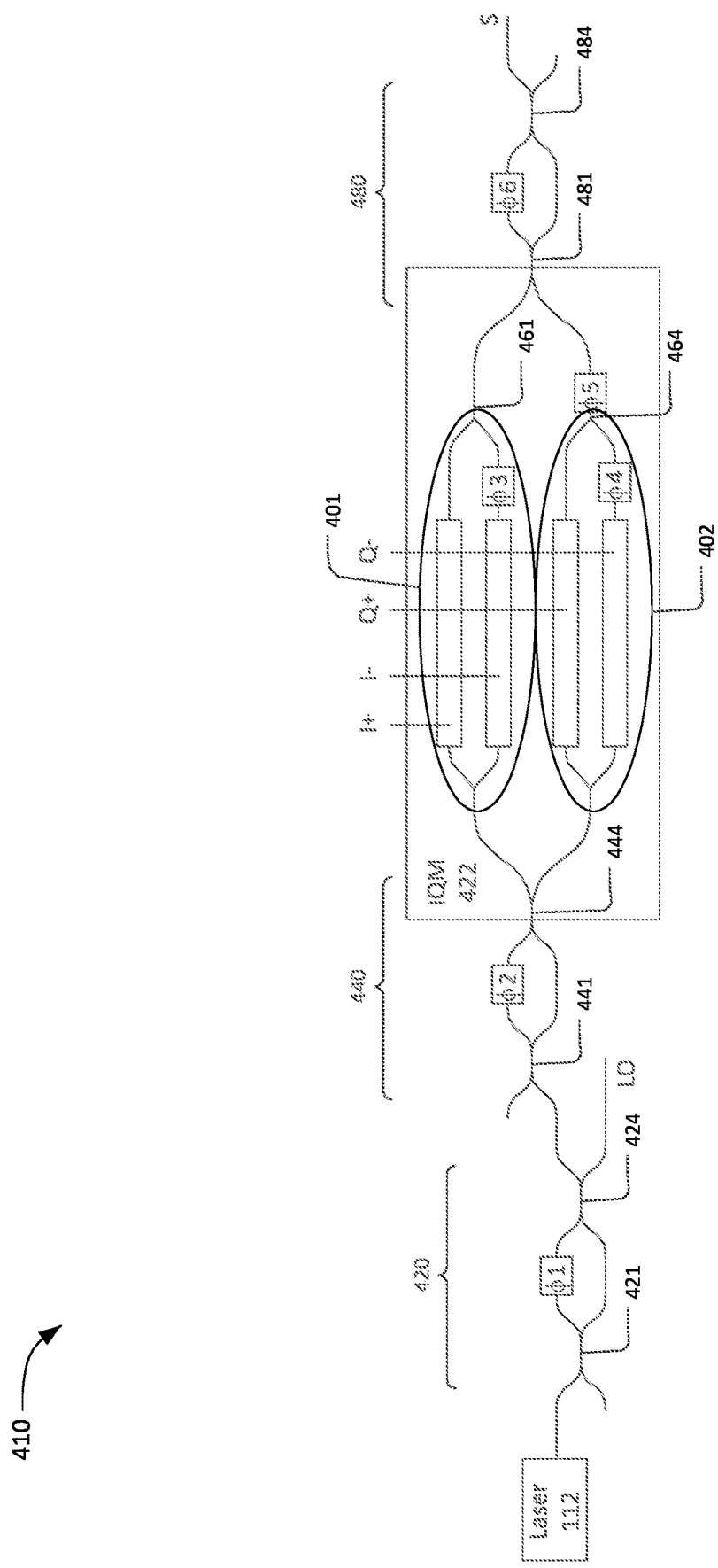
FIG. 4 is a schematic diagram of a transmitter system having a laser and coherent Mach-Zehnder modulators (MZMs) that are backwards compatible with intensity modulated direct detect (IMDD) formats.

FIGS. 4 and 5A-5C are schematic diagrams of transmitter and receiver system for PM-SH-ACD optical communications that are backwards compatible with intensity modulated direct detect (IMDD) formats. FIG. 4 is a schematic diagram of a transmitter system 410 for PM-SH-ACD optical communications including laser 112 and coherent Mach-Zehnder modulators (MZM1) 401 and (MZM2) 402 that are backwards compatible with intensity modulated direct detect (IMDD) formats. IMDD may be a cost-effective communication scheme compared to coherent ones. In IMDD, the intensity, or optical power, of the light beam from a laser or a light-emitting diode (LED) is modulated by the information bits and no phase information is needed. Thus, only one quadrature I or Q is needed, not both. Also, due to this nature, no local oscillator is required for IMDD communication, which greatly eases the cost of the hardware.

System 410 may be used in any of the for PM-SH-ACD optical communications systems and/or architectures herein. Modulator 422 is an IQ-modulator (IQM) used for quadrature amplitude modulation that is implemented using the two nested MZMs 401 and 402. IQ-modulator 422 has MZM 401 for creating optical quadrature component signal I of the optical modulated data signal 123 and has MZM 402 for creating optical quadrature component signal Q of the optical modulated data signal 123. Modulator 422 may be or be used in place of modulator 122. Three tunable couplers 420, 440 and 480 are added to render a conventional coherent transmitter such as TX 110 compatible with IMDD formats, such as PAM4.

System 410 includes laser 112, 6 phase shifters and 8 phase couplers, some of which are in each of tunable couplers 420, 440 and 480. Coupler 420 is a 2×2 coupler having phase shifter ($\Phi_1$) and phase couplers 421 and 424. Coupler 440 is a 2×2 coupler having phase shifter ($\Phi_2$) and phase couplers 441 and 444. Coupler 480 is a 2×2 coupler having phase shifter $\Phi_6$ and optionally also phase shifter ($\Phi_5$), and phase couplers 481 and 484. MZM 401 may include phase shifter $\Phi_3$ and phase coupler 461. MZM 402 may include phase shifter $\Phi_4$ and phase coupler 464.

A phase shifter $\Phi_1$ is adjusted for coupler 420 to select whether to route the light power (e.g., optical power) of laser 112 according to the desired modulation format, coherent or IMDD. For IMDD all the power is directed by coupler 420 to the modulator 422, and for coherent modulation a fraction (e.g., half) of the power is directed to the modulator 422 and a fraction (e.g., half) of the power is directed to the LO output which may go to MUX2 127. Phase shifters $\Phi_2$ and $\Phi_6$ are also adjusted accordingly, with shifter $\Phi_2$ adjusted so coupler 440 selects whether to direct all the light power coupler 440 receives to one of the two nested MZMs 401 or 402 for IMDD; or direct half of the power to each of the two nested MZMs 401 and 402 for coherent modulation. Also, shifter $\Phi_6$ is adjusted so coupler 480 select whether to receive all the light power from the directed to one of the two nested MZMs 401 or 402 for IMDD, or receive half of the power from each of the two nested MZMs 401 and 402 for coherent modulation. For IMDD only one MZM is needed because only one quadrature, I or Q, is needed to send the light power modulated communication signal, while for coherent modulation both quadratures are needed, such as for QPSK.

In both cases, IMDD and coherent, the three phase shifters $\Phi_1$, $\Phi_2$ and $\Phi_6$ can be set or adjusted using open or closed-loop control. In open-loop control, a lookup table can be used to set the phase of the phase shifters. In closed-loop control, a tap at the LO path and a tap before or after one of the nested MZMs are directed to monitor PDs to measure the optical power. The measured optical powers can be processed by a circuit, such as a µC (not shown but connected to each of the three phase shifters), to continuously set the correct value of phase shifting of shifters $\Phi_1$, $\Phi_2$, and $\Phi_6$. For example, the phase shifters can be dithered to obtain the derivative of measured power for IMDD versus phase for coherent modulation, in order to maintain the desired power directing operating points for IMDD or coherent. Dithering is just one possible method. The phase shifters can be implemented using electro-optic phase shifters, such as thermal phase shifters, a p-type and n-type semiconductor material (PN) junction phase shifters, or any kind of material that produces an electro-optic response sufficient for this use.

Consequently, for IMDD, the three phase shifters $\Phi_1$, $\Phi_2$ and $\Phi_6$ can be set or adjusted so that all of laser or light power is in modulated signal 125 (e.g., signal S) and none of the power is in carrier signal 115 (e.g., signal LO). Here, all of the light power may be in only one quadrature of the modulated light power signal 125. For coherent, the three phase shifters $\Phi_1$, $\Phi_2$ and $\Phi_6$ can be set or adjusted so that the light power is in or split between modulated signal 125 (e.g., signal S) and is in carrier signal 115 (e.g., signal LO) as noted for FIGS. 1A-8C.

For coherent modulation, phase shifter Φs of tunable coupler 480 is set to 90 degrees in order to bias the parent modulator 422 at quadrature.

Optical amplifiers, such as SOAs can be utilized in the transmitter 110 to increase the optical power in order to close the optical link, i.e., to have enough power at the HF PDs 144 of the receiver 130 for those PDs to operate at the specified bit-error rate.

Figure 5A:
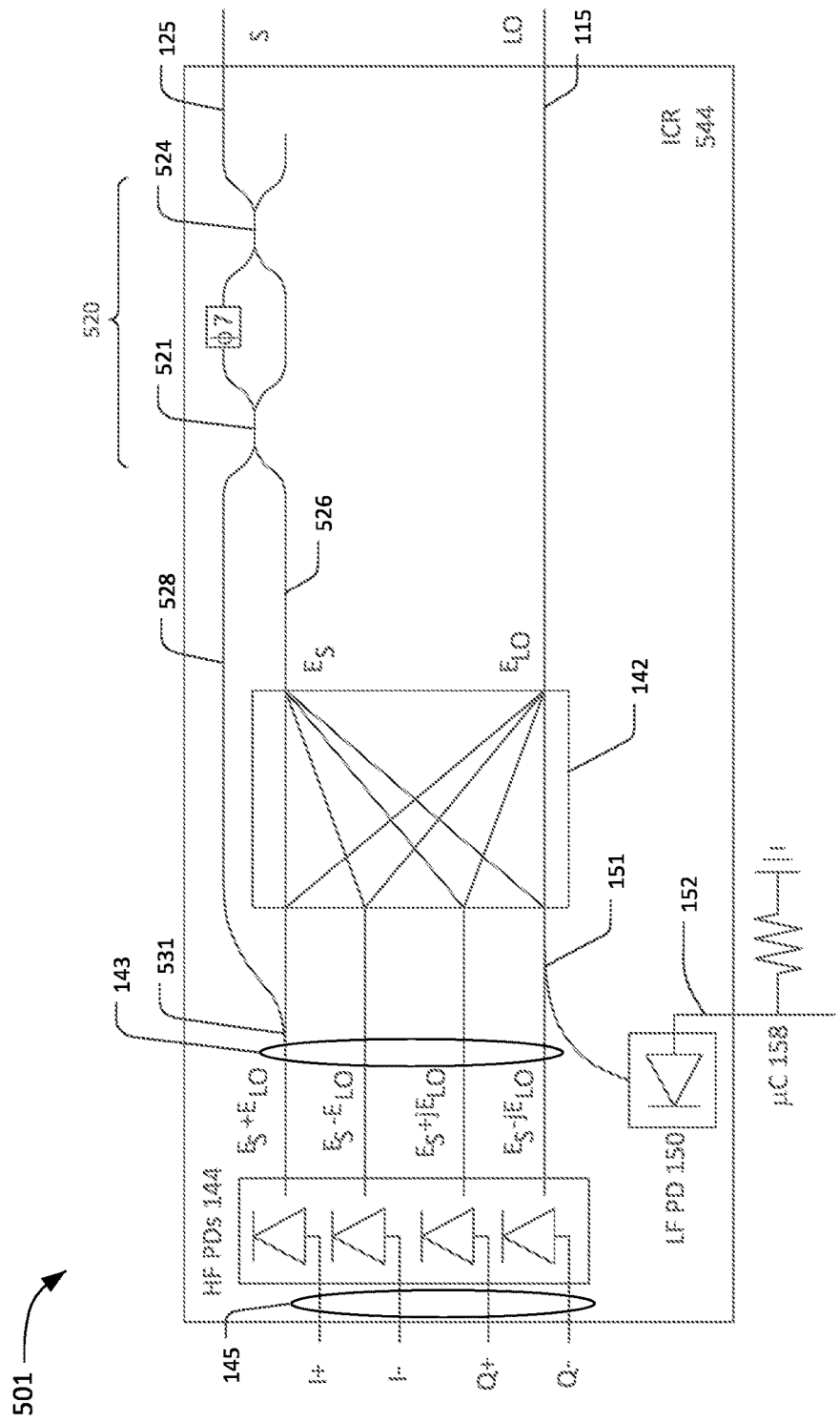
FIGS. 5A-5C are schematic diagrams of receiver systems 501 502 and 503 for PM-SH-ACD optical communications that are backwards compatible with IMDD formats.
Figure 5B:
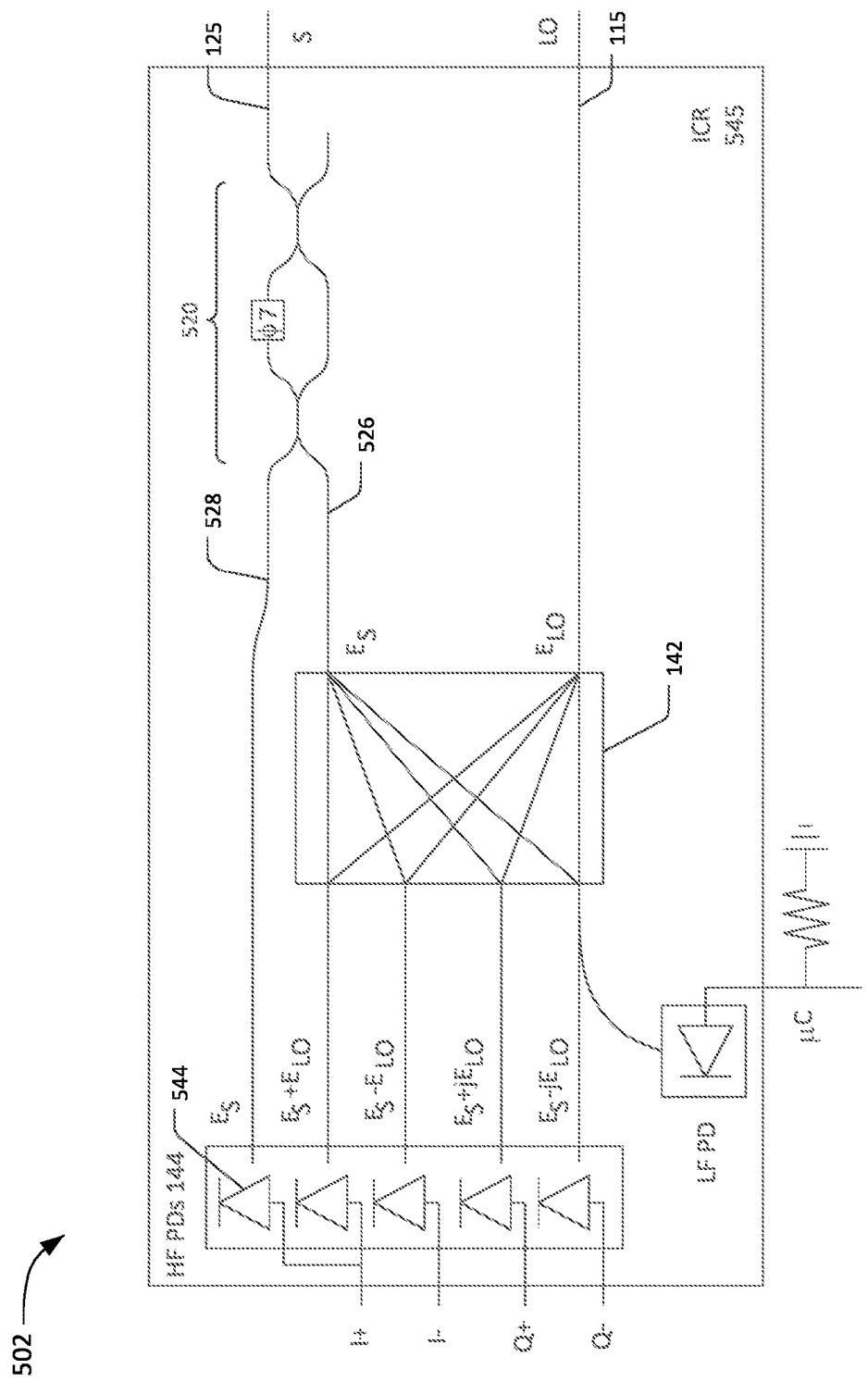
Figure 5C:
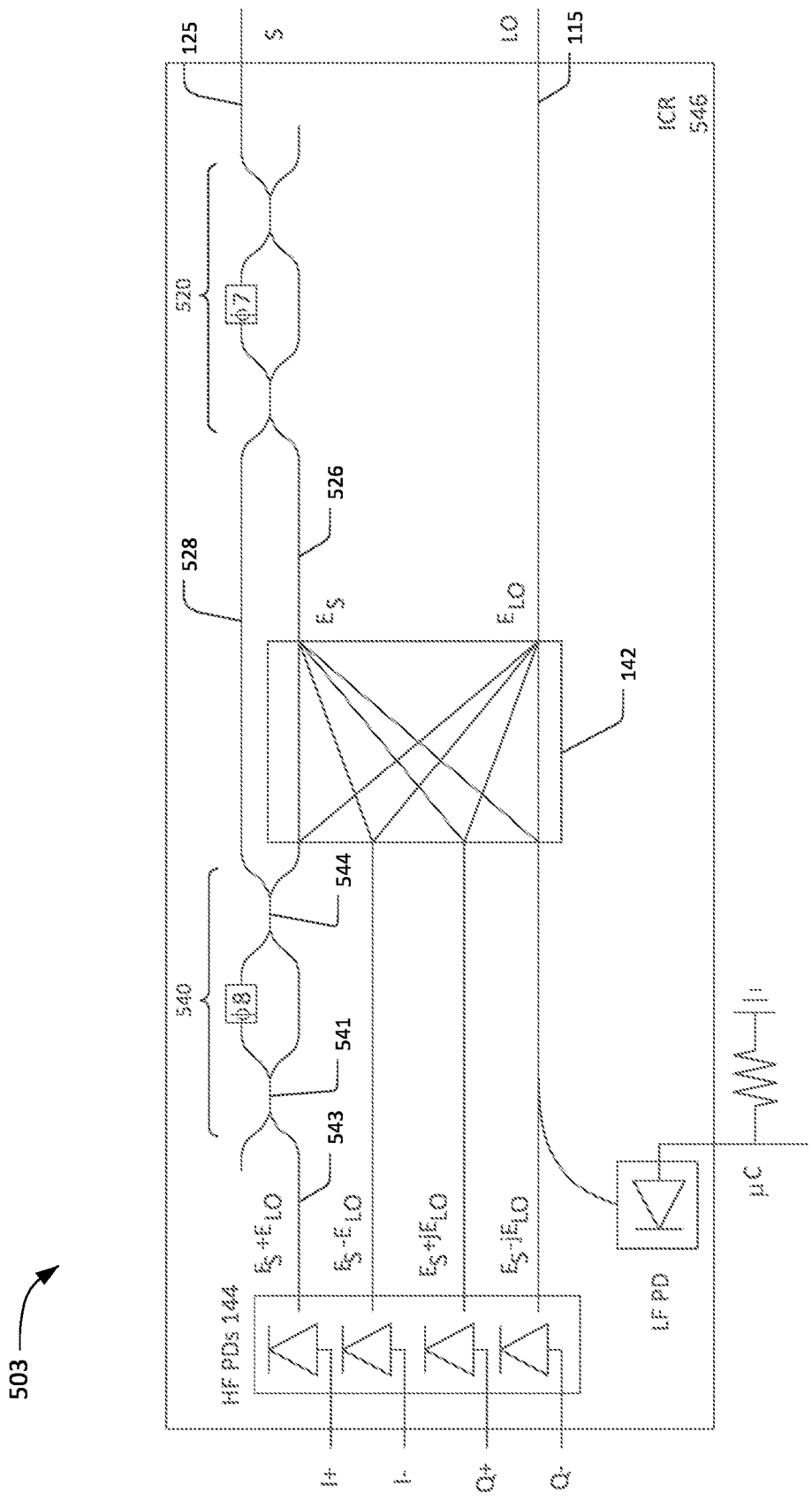

FIGS. 5A-5C are schematic diagrams of receiver systems 501, 502 and 503 for PM-SH-ACD optical communications that are backwards compatible with IMDD formats. Systems 501, 502 and 503 may be used in any of the for PM-SH-ACD optical communications systems and/or architectures herein. For example, ICRs 544, 545 and 546 of systems 501, 502 and 503 may include the hybrids 142 and PDs 144 of any of receivers 130, 160 and 170 of FIGS. 1A-1C. Also, ICRs 544, 545 and 546 or some components thereof may be used in place of the hybrids 142 and PDs 144, taps 151 and PDs 150 (and optionally resistors for PDs 150) of any of receivers 130, 160 and 170 of FIGS. 1A-1C. One or two tunable couplers 520 and 540 are added to hybrids 142 and PDs 144 to render a conventional coherent receiver such as any or RX 130, 160 or 170 compatible with IMDD formats, such as PAM4.

The polarization controller and/or PR and CR block 134 described in FIG. 4 enables backwards compatibility from coherent modulation to IMDD formats, by setting the phase shifters ($\Phi_1$ to $\Phi_4$) and/or tunable couplers 420, 440 and 480 of transmitter 410 such that all of the optical or light power is directed to the output that is connected to the S input of the ICR for IMDD. As a result of the backwards compatibility of transmitter 410, at the hybrid 142 in FIGS. 5A-5C, for IMDD formats, all of laser or light power is in modulated signal 125 (e.g., at input S) and none of the power is in carrier signal 115 (e.g., at input LO). Here, all of the light power may be in only one quadrature of the modulated light power signal 125/S. For coherent modulation, the light power is in or split between modulated signal 125 (e.g., at input S) and is in carrier signal 115 (e.g., at input LO) as noted for FIGS. 1A-3.

Thus, the backwards compatibility for IMDD can be implemented at the ICRs 544, 545 and 546 by maximizing the power detected by the LF PD that detects an optical tap of the signal $E_S+E_{LO}$, such as shown in systems 501/100, 502/102 and 503/104, using open or closed loop control. For simplicity, only one of the four LF PDs is shown, however two or each of the four outputs of 142 may have a tap and an LF PD. For example, ICRs 544, 545, and 546 only have one LF PD 150. There may be another tap 151, LP PD 150 and signal 152 (or any of the other two measurement options) for the two tone solutions having signal 192 for each quadrature I and Q, or each of the hybrid outputs. In the particular case of IMDD mode, optical power can be measured at the IMDD path $E_S+jE_{LO}$ (e.g., the Q quadrature can be measured by any of the three options) and the controller 158 can be used to maximize to maximize that power measurement. The polarization controller's X and Y outputs (see FIGS. 2 and 8A-C) may be connected to the ICR's S and LO inputs. Output X may be connected to input S and output Y connected to input LO; or output X may be connected to input LO and output Y connected to input S. The IMDD data signal, similar to signal 145 but having IMDD data, can be monitored or detected at the ICRs 544, 545 and 546 by detecting the data in the signal 155 from PD 150 from tap 151 and sending that signal to controller 158 or to RX DSP 148. In the case of IMDD, the microcontroller can adjust the phase shifters in the PR+CR block 134 to maximize the signal power received in the LF PD, which in FIG. 5 A-C corresponds to the $E_S+jE_{LO}$ output of the hybrid. For IMDD, no tone signal 192 is necessary and only the total received signal power is used.

ICR 544 of FIG. 5A includes the hybrids 142, PDs 144 and tunable coupler 520 having phase shifter $\Phi_7$ and phase couplers 521 and 524. Tunable coupler 520 receives signal S (e.g., signal 125) and outputs signal 526 to input $E_S$ of hybrid 142 and/or outputs signal 528 to phase coupler 531. Phase coupler 531 receives signal 528 and couples it with signal 143 from hybrid 142 to send as a coupled signal to input $E_S+E_{LO}$ of PDs 144, as shown. ICR 544 also includes tap 151 of one or multiple signals 143 to LF PD 150, and signal 155 from PD 150 to microcontroller 158.

ICR 545 of FIG. 5B includes the hybrids 142, PDs 144 and tunable coupler 520. Tunable coupler 520 receives signal S and outputs signal 526 to input $E_S$ of hybrid 142 and outputs signal 528 to new input $E_S$ of an additional HF PD 544 of PDs 144 which adds signal 528 to the I+ channel PD of PDs 144. ICR 544 also includes tap 151 of one of signals 143 to LF PD 150, and signal 155 from PD 150 to microcontroller 158.

ICR 546 of FIG. 5C includes the hybrids 142, PDs 144, tunable coupler 520 and tunable coupler 540 having phase shifter $\Phi_8$ and phase couplers 541 and 544. Tunable coupler 540 receives signal 528 and outputs signal 543 to input $E_S+E_{LO}$ of PDs 144, as shown. ICR 544 also includes tap 151 of one of signals 143 to LF PD 150, and signal 155 from PD 150 to microcontroller 158.

In all the variants of ICRs 544, 545 and 546, the optical 90-degree hybrid 142 can be bypassed by using a tunable coupler 520, which is controlled by setting the value of phase shifter $\Phi_7$. In coherent operation, phase shifter $\Phi_7$ is set so that all of the optical power in the S path is routed to the $E_S$ input of the optical hybrid, as noted for FIGS. 1A-3. In IMDD operation, phase shifter $\Phi_7$ is set so none of the optical power in the S path is routed to the $E_S$ input of the optical hybrid 142, but is instead routed as signal 528.

ICR 544 may use a 2×1 tunable coupler 520 to route the two paths to the I+ output of PDs 144. Signal 526 is routed to input $E_S$ of hybrid 142 for coherent modulation or signal 528 routed directly to input $E_S+E_{LO}$ of PDs 144 for IMDD. ICR 545 may add an additional HF PD 544 to the I+ channel PD of PDs 144. Signal 526 is routed to input $E_S$ of hybrid 142 for coherent modulation or signal 528 routed directly to input $E_S$ of HP PD 544 and that output is added to add the HF PD output of the HF PDs 144 having input $E_S+E_{LO}$. ICR 546 may use coupler 520 and an additional two 2×1 tunable couplers 540, which is controlled by setting phase shifter $\Phi_7$ to route signal 526 to input $E_S$ of hybrid 142 for coherent modulation or to route signal 528 as signal 543 directly to input $E_S+E_{LO}$ of PDs 144 for IMDD.

Each of the tunable couplers 420, 440, 480, 520 and 540 may have a first phase coupler for coupling a first and second input into a first and second output; a first phase shifter for outputting a phase shifted version of the first output; and a second phase coupler for coupling the phase shifted version and the second output.

For all ICRs 544, 545 and 546, as described for FIG. 4 in transmitter backwards compatibility, the control of phase shifters $\Phi_7$ and $\Phi_8$ can be implemented via open loop control using a lookup table, or via closed-loop control by dithering phase shifter $\Phi_7$ and $\Phi_8$. Dithering is just one possible method.

The systems, architectures and processes to achieve receiver backwards compatibility from coherent modulation to IMDD described herein is also applicable to DSP-based coherent solutions, such as "DSP-Lite" and 400ZR, in which the carrier recovery and polarization control are performed in the digital domain using DSP.

Optical amplifiers, such as SOAs can be utilized in the receivers of ICRs 544, 545 and 546 to increase the optical power in order to close the optical link, i.e., to have enough power at the HF PDs 144 and 544 to operate at the specified bit-error rate.

A proposed subsequent generation 1.6 Tb/s and 3.2 Tb/s solutions may be future or backwards compatible with the 800 Gb/s and 1.6 Tb/s solutions (e.g., described herein), respectively. An architecture for 1.6 Tb/s may be based on 4-wavelength 100 Gbaud 16QAM transmission. This architecture for 1.6 Tb/s can interface with 800 Gb/s 4-wavelength 50 Gbaud 16QAM by operating both TX and RX at half the nominal data rate. An architecture for 3.2 Tb/s may be based on 8-wavelength 100 Gbaud 16 QAM transmission. This architecture for 3.2 Tb/s can interface with 1.6 Tb/s 4-wavelength 100 Gbaud 16QAM by only utilizing half of the slices of the TX and RX.

Figure 6A:
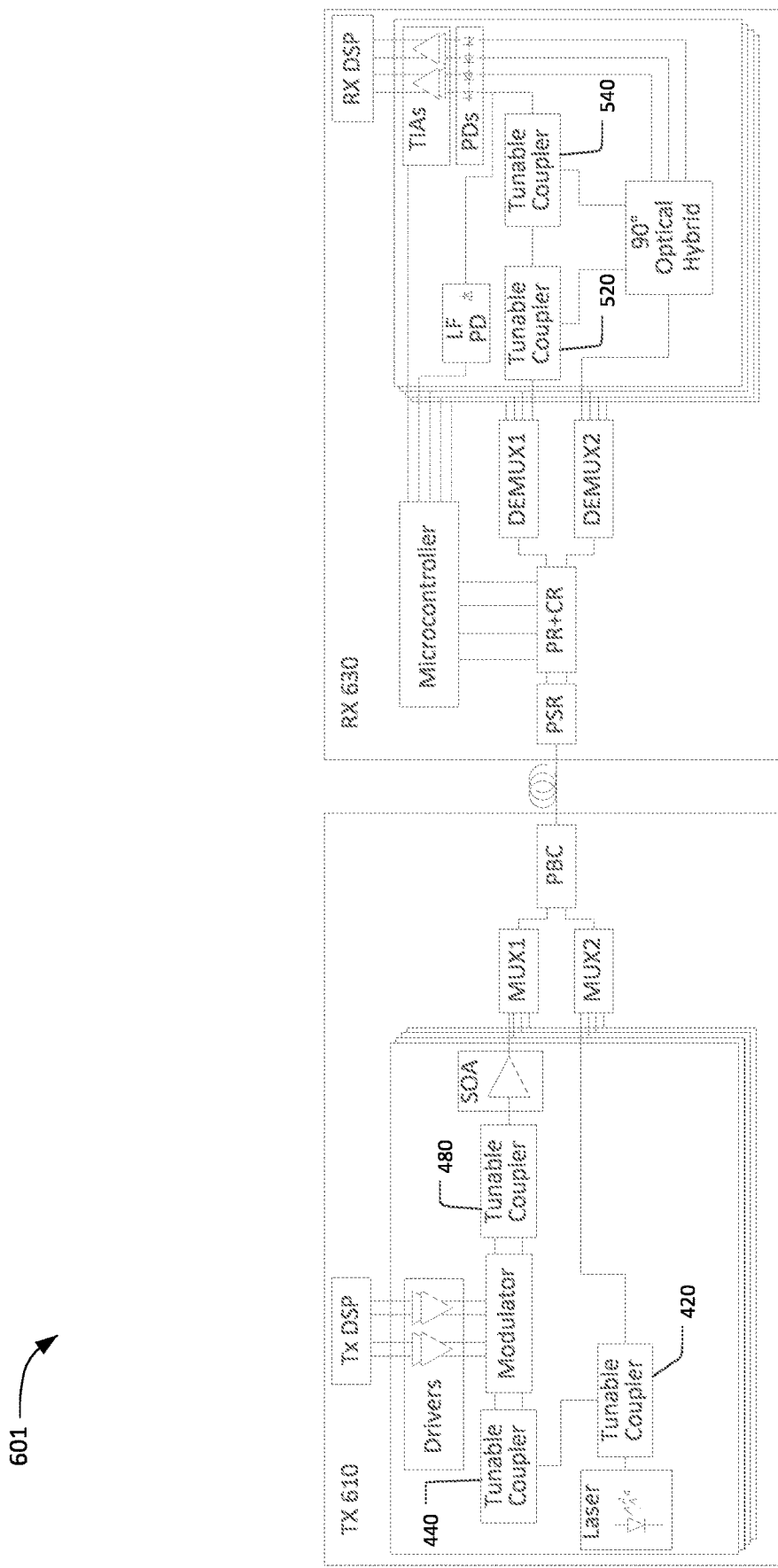
FIGS. 6A-6C are block diagrams of systems for PM-SH-ACD optical communications that are backwards compatible with IMDD formats.
Figure 6B:
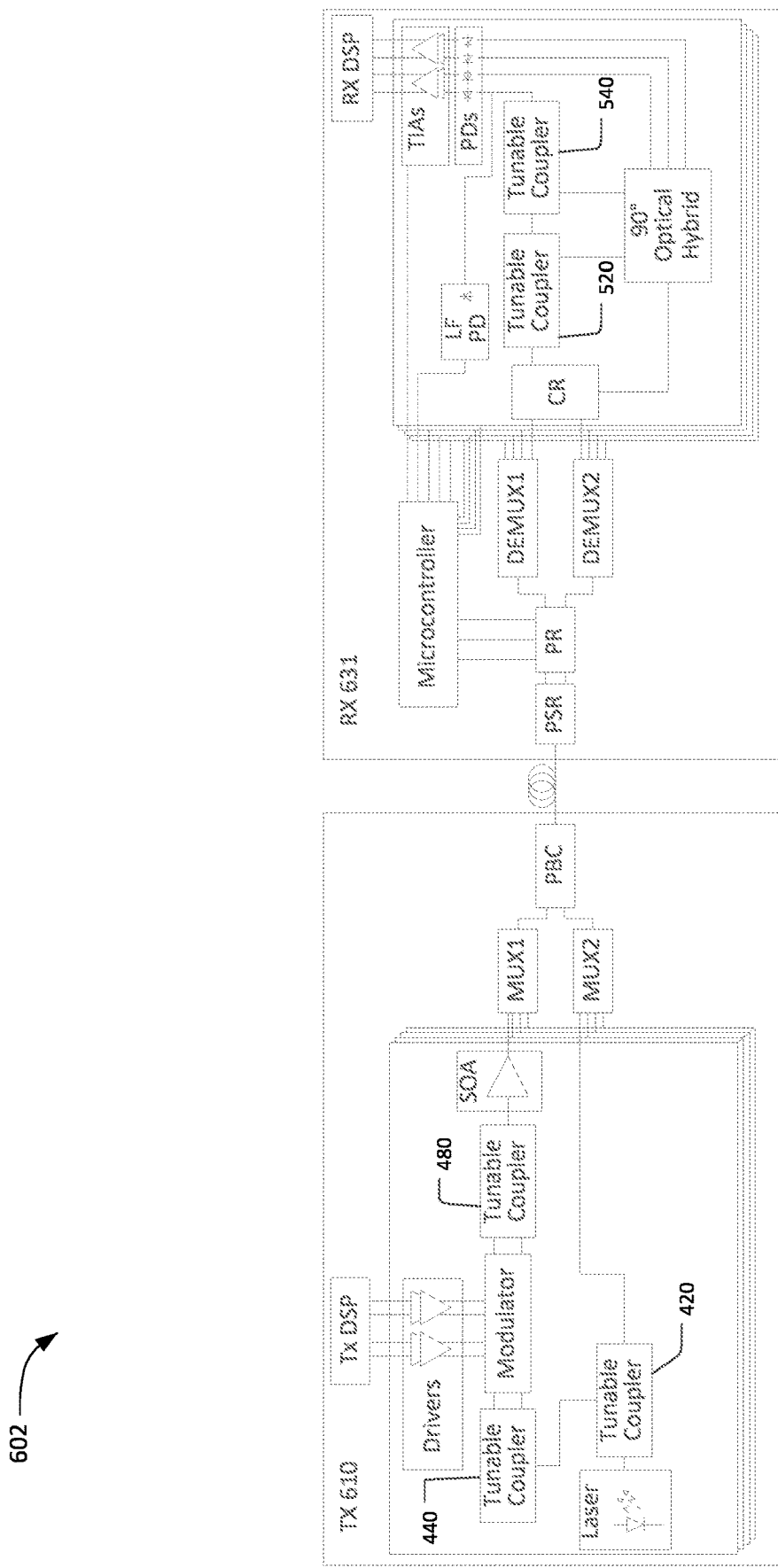
Figure 6C:
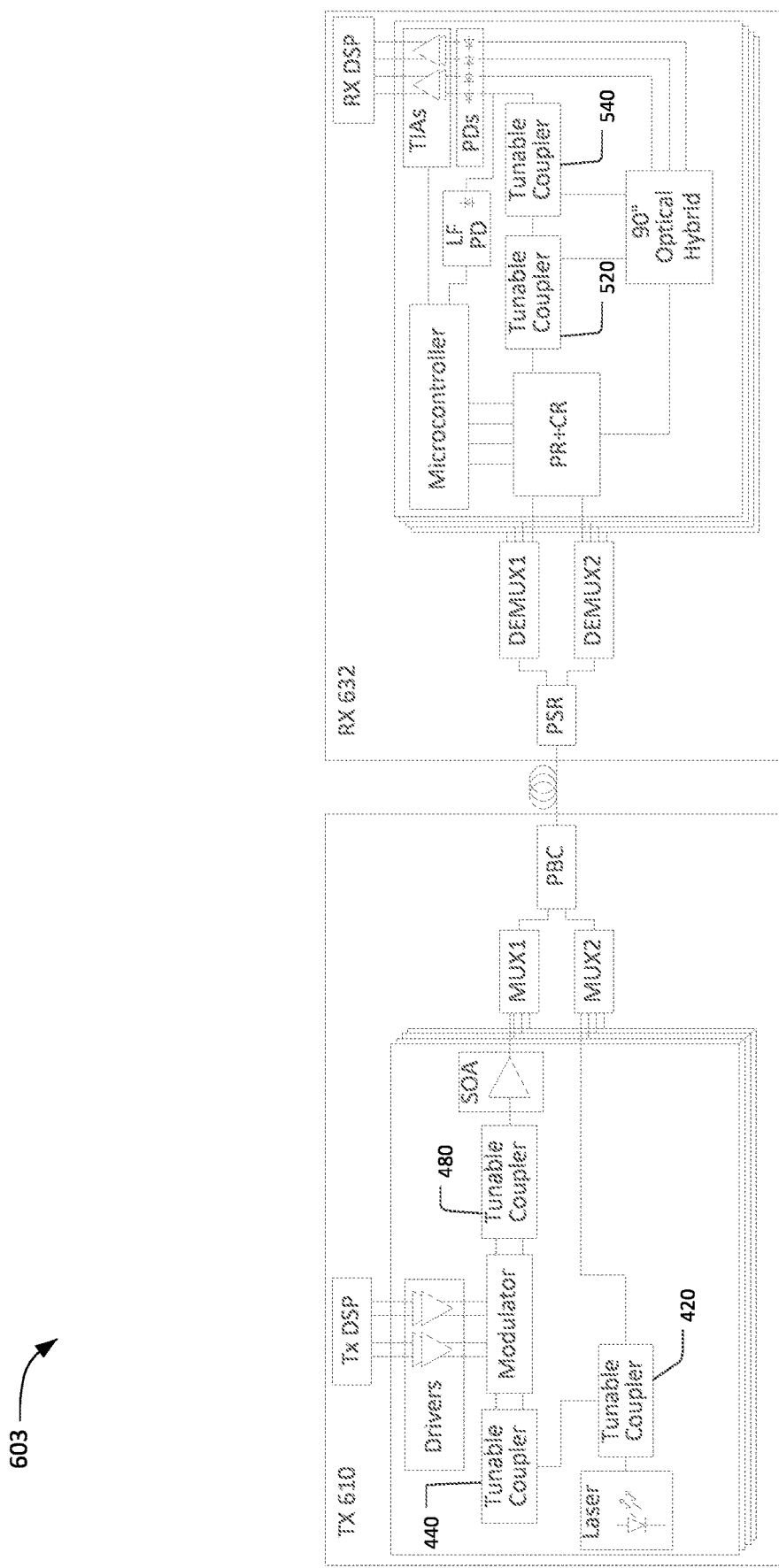

FIGS. 6A-6C are block diagrams of systems 601, 602 and 603 for PM-SH-ACD optical communications that are backwards compatible with IMDD formats. Systems 601, 602 and 603 may be systems 100, 102 and 104 having architecture 400 and any of architectures 501, 502 and 503, respectively, to be backwards compatible with IMDD formats. In some cases, systems 601, 602 and 603 may be systems 100, 102 and 104 having architecture 400 and architectures 503.

Each of Systems 601, 602 and 603 may be a full transceiver block diagrams incorporating backward compatibility functions in TX and RX.

Systems 601, 602 and 603 show a PM-SH-ACD link architecture with tunable couplers 420, 440 and 480 added to TX 110 to create TX 410 or TX 610. System 601 shows a PM-SH-ACD link architecture with tunable couplers 520 and 540 added to RX 130 to create ICR 544 and/or RX 630. System 602 shows a PM-SH-ACD link architecture with tunable couplers 520 and 540 added to RX 160 to create ICR 545 and/or RX 631. System 603 shows a PM-SH-ACD link architecture with tunable couplers 520 and 540 added to RX 170 to create ICR 546 and/or RX 632.

Description of Processes

Figure 7:
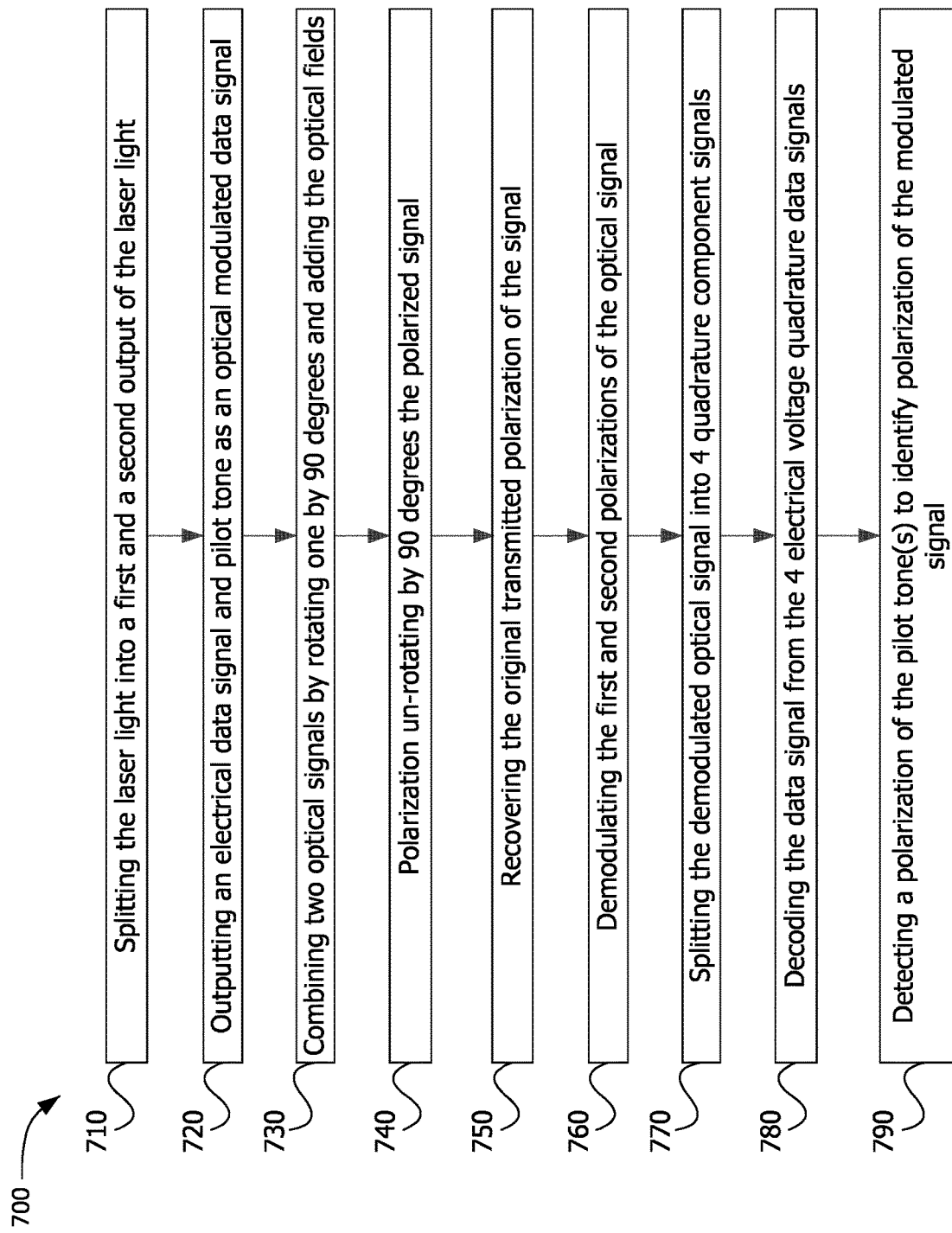
FIG. 7 shows a flow chart of a process flow for PM-SH-ACD optical communications.

FIG. 7 shows a flow chart of a process 700 flow for PM-SH-ACD optical communications. The process 700 may be performed by one or more of the systems, architectures, transmitters and/or receivers of FIGS. 1A-6C. The process 700 starts at step 710 and can end at step 790, but the process can also be cyclical by returning to step 710 after step 790. For example, the process may return to be performed additional times after changing data paths from or the TX DSP 116, changing modulation at drivers 118 or changing modulation at modulator 122.

Step 710 is splitting laser light into a first and a second output of the laser light. Step 710 may include receiving a laser light having one frequency from a laser that is to be split. Step 710 may be performed by laser 112 and/or splitter 114.

Step 720 is outputting an optical modulated data signal of the first output of the laser light modulated with QPSK electrical data signals based on output channel data signals and a pilot tone signal identifying a polarization of the modulated signal. Step 720 may include receiving the electrical output channel data signals in one of various modulation formats. Step 720 may include voltage amplifying or QPSK modulating the electrical output channel data signals into electrical QPSK data signals prior to optical modulation with the laser light. Step 720 may be performed by TX DSP 116, drivers 118 and/or modulator 122.

Step 730 is combining into two optical signals, by rotating the polarization of one of the signals by 90 degrees and adding the optic fields of the rotated signal one of and the non-rotated one of the optical modulated data signal and the second output of the laser light. Step 730 may include polarization rotating by 90 degrees one of the optical modulated data signal or the second output of the laser light, prior to combining or adding, step 730 may include transmitting the polarized signal to a fiber optic cable. Step 730 may be performed by PBC 128.

Step 740 is polarization un-rotating by 90 degrees the polarized signal into a first polarized optical signal and a second polarized optical signal, each having at least some of the second output of the laser light and some of the optical modulated data signal. Step 740 may include that the received signal's two received polarizations are separated and then one of them is rotated by 90 degrees. Step 740 may include splitting of the two polarizations and 90-degree rotation of one of them. Step 740 may include receiving the polarized signal from the fiber optic cable. Step 740 may be performed by PSR 132.

Step 750 is recovering the original transmitted polarization of the signal 182. Step 750 may include recovering the original transmitted polarization of the first 129 and second 119 polarized optical signals based on a received polarization recovery signal to recover a polarization fixed first optical signal, having the optical modulated data signal and to recover a polarization fixed second optical signal having the second output of the laser light, wherein the first and second polarization fixed first optical signal have the same polarization. Step 750 may be performed by block 134, block 164 or block 174.

Steps 760 is demodulating the first and second polarizations of the optical signal 182. Step 760 may include (a) recovering the frequency and phase of the second output of the laser light 119 from the polarization fixed second optical signal; (b) demodulating the polarization fixed first optical signal 125 into a polarization and frequency fixed first optical signal having the data signal and the pilot tone signal; and (c) demodulating the polarization fixed second optical signal into a polar, frequency and phase fixed second optical signal that is the second output of the laser light. In some case, (a) recovering the frequency and phase is not performed. Step 760 may be performed by block 134, block 165 or block 174.

Steps 750 and 760 may be performed simultaneously by block 134 or 174. In other cases, step 750 may be performed by block 164 and step 760 performed later by block 165.

Step 770 is splitting the polarization and frequency fixed first optical signal and the polar, frequency and phase fixed second optical signal into 4 optical quadrature component signals (I+, I−, Q+, Q−). Step 770 may also include converting the 4 optical quadrature component signals into 4 electrical current quadrature signals, and converting the 4 electrical current quadrature signals to 4 electrical voltage (e.g., QPSK) quadrature data signals. Step 770 may be performed by hybrid 142, PDs 144 and TIAs 146.

In some cases, step 770 may include (a) recovering the frequency and phase of the second output of the laser light 119 from the polarization fixed second optical signal; (b) demodulating the polarization fixed first optical signal 125 into a polarization and frequency fixed first optical signal having the data signal and the pilot tone signal; and (c) demodulating the polarization fixed second optical signal into a polar, frequency and phase fixed second optical signal that is the second output of the laser light. In some case, (a) recovering the frequency and phase is not performed. This part of step 770 may be performed by block 134, block 165 or block 174.

Step 780 is decoding the (e.g., QPSK) data signal from the 4 electrical voltage QPSK quadrature data signals. Step 780 may be performed by RX DSP 148.

Step 790 is detecting a polarization of the pilot tone signal(s) to identify a polarization of the modulated signal. Step 790 may include detecting a polarization of one or two tone signals 192, Step 790 may also include outputting the pilot signal measurement signal to the microcontroller based on the detected polarization. Step 790 may also include sending the polarization recover signal to the polarization recover component based on a received pilot signal measurement signal. Step 790 may be performed by tap 151 and blocks 150; TIA 154; and/or using TIAs 146 to provide an output voltage signal 155 with an amplitude based on the amplitude of signal 192. Based on the signal 155, the amplitude of the pilot tone signal 192 is measured using a microcontroller (μC) 158, which may perform a PR and CR algorithm for or of block 134; 164 and 165; and/or 174.

In some cases, only steps 710-730 or 740-790 are performed. In some cases, only steps 720, 730, 750, 760 and 790 are performed.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for polarization-multiplexed self-homodyne analog coherent (PM-SH-ACD) architecture for optical communication links, the system comprising:

a receiver section having:

a polarization splitter rotator (PSR) for splitting received light from an optical fiber into its two constituent polarization components;

a polarization recovery (PR) component for demultiplexing the two constituent polarization components into two demultiplexed polarization signals using a pilot tone or other signal;

a carrier recovery (CR) component for locking the phase of the two demultiplexed polarization signals at the output of the PR component into a first and a second phase-locked signal, the first phase-locked signal containing a modulated signal and the second phase-locked signal containing an unmodulated signal;

a 90 degree optical hybrid component for producing optical quadrature components of the two phase-locked signals;

photodiodes (PDs) for converting the optical quadrature components into electrical current quadrature signals;

two TIAs for converting the electrical current quadrature signals to electrical voltage quadrature data signals; and a polarization detector for detecting one or more pilot tone signals used by the PR component to determine the state of polarization of the two constituent polarization components.

2. The system of claim 1, further comprising:
a transmitter section having:
  an optical modulator for outputting the optical modulated data signal of a first output of a laser light modulated with a data signal and a pilot tone signal; and
  a polarization beam combiner (PBC) for:
    polarization rotating by 90 degrees one of the optical modulated data signal or the second output of the laser light;
    combining the unrotated and rotated polarization optical signals.

3. The system of claim 2, the transmitter section further comprising:
a transmitter digital signal processor (TX DSP) sending output channel data signals in one of various modulation formats, the data signal based on the output channel data signals;
a laser for outputting a laser light having one frequency and one phase to a splitter for creating the first and the second output of the laser light;
the receiver section further comprising:
a receiver digital signal processor (Rx DSP) for decoding output channel data signals from the 4 electrical voltage quadrature data signals;
a microcontroller for sending a polarization recovery signal to the polarization recovery component based on a received pilot signal measurement signal; and
wherein the polarization detector outputs one or more of the pilot signal measurement signals to the microcontroller.

4. The system of claim 2,
the transmitter section further comprising:
  a plurality of transmitter slices each having:
    a laser with a different frequency than a laser of any other of the plurality of transmitter slices;
    the splitter for splitting the laser into paths for modulated and unmodulated light;
    drivers for creating the data signal that is different than a data signal of any other of the plurality of transmitter slices from the output channel data signals;
    the optical modulator for outputting the optical modulated data signal;
  a first multiplexer (MUX1) for combining the optical modulated data signal of the plurality of transmitter slices into a combined optical modulated data signal;
  a second multiplexer (MUX2) for combining the second output of the laser light of the plurality of transmitter slices into a combined optical carrier signal;
  wherein the PBC is for:
    polarization rotating by 90 degrees one of the optical modulated data signal or the second output of the laser light;
    combining the unrotated and rotated optical polarizations;
the receiver section further comprising:
  a first demultiplexer (DEMUX1) for splitting the optical signal from the first split polarization component into a plurality of optical signals with different frequencies for a plurality of receiver slices;
  a second demultiplexer (DEMUX2) for splitting the optical signal from the first split polarization component into a plurality of optical signals with different frequencies for the plurality of receiver slices;
  the plurality of receiver slices each having:
    the 90 degree optical hybrid component;
    the 4 photodiodes (PDs);
    the two TIAs; and
    the polarization detector.

5. The system of claim 4, the transmitter section further comprising no SOAs, one SOA or a plurality of SOAs for amplifying at least one of the optical modulated data signal and the second output of the laser light, at least one of prior to or after the MUX1 and MUX2; and
the receiver section further comprising no SOAs, one SOA or a plurality of SOAs for amplifying at least one constituent polarization components.

6. The system of claim 2, wherein the optical modulator is an IQ-modulator having a first Mach-Zehnder Modulator (MZM1) and a second Mach-Zehnder Modulator (MZM2) for creating optical quadrature component signals.

7. The system of claim 6, further comprising an architecture for coherent modulation that is a backwards compatible architecture for IMDD, the architecture having:
a first tunable coupler between a laser and the IQ-modulator, the first tunable coupler for selecting whether to route (a) all power of the second output of the laser to the IQ-modulator for IMDD; or (b) some power of the second output of the laser to the IQ-modulator and some of the power the second output of the laser signal to the MUX2 for coherent modulation;
a second tunable coupler between the first tunable coupler and the IQ-modulator for selecting whether to direct (a) all the light power the second tunable coupler receives from the first tunable coupler to one of the MZM1 or the MZM2 for IMDD; or (b) half of the power the second tunable coupler receives from the first tunable coupler to each of the MZM1 and the MZM2 for coherent modulation; and
a third tunable coupler between the first and second MZMs and the MUX1 for selecting whether to (a) receive all the light power from the one of the MZM1 and the MZM2 for IMDD, or (b) receive half of the light power from each of the MZM1 or the MZM2 for coherent modulation.

8. The system of claim 7, further comprising one of:
a fourth tunable coupler between DEMUX1 and the 90 degree optical hybrid component, the fourth tunable coupler for selecting whether to route all power of the optical signal to the photodiodes for IMDD or to the 90 degree optical hybrid component for coherent modulation;
a fifth tunable coupler between DEMUX1 and the 90 degree optical hybrid component, the fifth tunable coupler for selecting whether to route all power of the optical signal to a fifth HF photodiode added to the 4 photodiodes for IMDD, or to the 90 degree optical hybrid component for coherent modulation; or
the fourth tunable coupler and a sixth tunable coupler between the fourth tunable coupler and the 90 degree optical hybrid component and the 4 photodiodes (PDs) for selecting whether to route all power from the fourth tunable coupler to one of the photodiodes for IMDD or from the 90 degree optical hybrid component to the 4 photodiodes for coherent modulation.

9. The system of claim 8, wherein each of the first-sixth tunable couplers has a first coupler for coupling a first and second input into a first and second output; a first phase shifter for outputting a phase shifted version of the first output; zero or one second phase shifters for outputting a phase shifted version of the second output; and a second coupler for coupling the phase shifted versions of the first and second outputs.

10. The system of claim 1, wherein the PR and CR components form a combined PR and CR block comprising four sets of 2 phase shifters and 1 coupler, each of the 2 phase shifters for phase shifting a separate input into a separate phase shifted output, and each of the 1 coupler for coupling the separate outputs of the 2 phase shifters into a coupled signal output;
wherein separate inputs of 2 phase shifters of a first set of the four sets are for receiving the first and second constituent polarization components of the received optical signal; and
wherein separate inputs of 2 phase shifters of a second, third and fourth set of the four sets are for receiving the coupled signal output from the 1 coupler of a prior set of the four sets.

11. The system of claim 1, wherein the polarization detector includes one of:
at least one optical tap having a low frequency photodiode and a resistor for reading at least one first voltage signal from at least one of the 4 optical quadrature component signals;
at least one TIA for reading at least one second voltage signal of at least one of the 4 electrical voltage quadrature data signals; or
at least one of the two TIAs for reading at least one third voltage signal of at least one of the 4 electrical voltage quadrature data signals;
wherein the pilot signal measurement signal is one or more of the first, second or third at least one voltage signal.

12. A system for polarization-multiplexed self-homodyne analog coherent (PM-SH-ACD) architecture for optical communication links, the system comprising:
a polarization splitter rotator (PSR) for splitting received light from an optical fiber into its two constituent polarization components;
a polarization recovery (PR) component for demultiplexing the two constituent polarization components into two demultiplexed polarization signal using a pilot tone;
a carrier recovery (CR) component for locking the phase of the two demultiplexed polarization signals at the output of the PR component into a first and a second phase-locked signal, the first phase-locked signal containing a modulated signal and the second phase-locked signal containing an unmodulated signal;
a 90 degree optical hybrid component for producing optical quadrature components of the two phase-locked signals;
photodiodes (PDs) for converting the optical quadrature component signals into electrical current quadrature signals;
two TIAs for converting the electrical current quadrature signals to electrical voltage quadrature data signals; and
a polarization detector for detecting the pilot tone signals used by the PR component to determine the state of polarization of the two constituent polarization components.

13. The system of claim 12, further comprising:
an optical modulator for outputting the optical modulated data signal of a first output of a laser light modulated with a data signal and a pilot tone signal; and
a polarization beam combiner (PBC) for:
polarization rotating by 90 degrees one of the optical modulated data signal or the second output of the laser light.

14. The system of claim 13, further comprising:
a plurality of transmitter slices each having:
a laser with a different frequency than a laser of any other of the plurality of transmitter slices;
the splitter for splitting the laser into paths for modulated and unmodulated light;
drivers for creating the data signal that is different than a data signal of any other of the plurality of transmitter slices from the output channel data signals;
the optical modulator for outputting the optical modulated data signal;
a first multiplexer (MUX1) for combining the optical modulated data signal of the plurality of transmitter slices into a combined optical modulated data signal;
a second multiplexer (MUX2) for combining the second output of the laser light of the plurality of transmitter slices into a combined optical carrier signal;
wherein the PBC is for:
polarization rotating by 90 degrees one of the optical modulated data signal or the second output of the laser light;
combining the unrotated and rotated optical polarizations;
a first demultiplexer (DEMUX1) for splitting the optical signal from the first split polarization component into a plurality of optical signals with different frequencies for a plurality of receiver slices;
a second demultiplexer (DEMUX2) for splitting the optical signal from the first split polarization component into a plurality of optical signals with different frequencies for the plurality of receiver slices;
the plurality of receiver slices each having:
the 90 degree optical hybrid component;
the 4 photodiodes (PDs);
the two TIAs; and
the polarization detector.

15. The system of claim 13, further comprising an architecture for coherent modulation that is a backwards compatible architecture for IMDD, the architecture having:
a first tunable coupler between a laser providing the laser light and the modulator, the first tunable coupler for selecting whether to route (a) all power of the laser light to the modulator for IMDD; or (b) some power of the laser light to the modulator and some of the power the laser light to the MUX2 for coherent modulation;
a second tunable coupler between the first tunable coupler and the modulator for selecting whether to direct (a) all the light power the second tunable receives from the first tunable coupler to one of the MZM1 or the MZM2 for IMDD; or (b) half of the power the second tunable coupler receives from the first tunable couple to each of the MZM1 and the MZM2 for coherent modulation; and
a third tunable coupler between the first and second MZMs and the MUX1 for selecting whether to (a) receive all the light power from the one of the MZM1 or the MZM2 for IMDD, or (b) receive half of the light power from each of the MZM1 and the MZM2 for coherent modulation.

16. The system of claim 15, further comprising one of:
a fourth tunable coupler between DEMUX1 and the 90 degree optical hybrid component, the fourth tunable coupler for selecting whether to route all power of the optical signal to the photodiodes for IMDD or to the 90 degree optical hybrid component for coherent modulation;

a fifth tunable coupler between DEMUX1 and the 90 degree optical hybrid component, the fifth tunable coupler for selecting whether to route all power of the optical signal to a fifth HF photodiode added to the 4 photodiodes for IMDD, or to the 90 degree optical hybrid component for coherent modulation; or the fourth tunable coupler and a sixth tunable coupler between the fourth tunable coupler and the 90 degree optical hybrid component and the 4 photodiodes (PDs) for selecting whether to route all power from the fourth tunable coupler to one of the photodiodes for IMDD or from the 90 degree optical hybrid component to the 4 photodiodes for coherent modulation.

* * * * *